US012756518B2

(12) United States Patent
Li

(10) Patent No.: US 12,756,518 B2
(45) Date of Patent: Oct. 6, 2026

(54) INFORMATION PROCESSING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 334 days.

(21) Appl. No.: 18/280,451

(22) PCT Filed: Mar. 2, 2021

(86) PCT No.: PCT/CN2021/078777
§ 371 (c)(1),
(2) Date: Sep. 5, 2023

(87) PCT Pub. No.: WO2022/183386
PCT Pub. Date: Sep. 9, 2022

(65) Prior Publication Data
US 2024/0163052 A1 May 16, 2024

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0626* (2013.01); *H04W 68/02* (2013.01); *H04W 76/20* (2018.02)

(58) Field of Classification Search
CPC ....... H04L 5/0051; H04L 5/00; H04L 5/0048; H04W 76/20; H04W 68/02; H04W 72/04; H04B 7/0626
See application file for complete search history.

(56) References Cited

U.S. PATENT DOCUMENTS

2016/0157235 A1* 6/2016 Xue ........................ H04L 43/16 370/329
2019/0260543 A1 8/2019 Gong et al.
(Continued)

FOREIGN PATENT DOCUMENTS

CN 107370582 A * 11/2017 ........... H04L 5/0051
CN 107395534 A * 11/2017 ......... H04L 25/0224
(Continued)

OTHER PUBLICATIONS

CNOA issued in Application No. 202180000697.0 dated Jan. 9, 2025 with English translation, (17p).
(Continued)

*Primary Examiner* — Phong La
(74) *Attorney, Agent, or Firm* — Arch & Lake LLP; Hao Tan; Shen Wang

(57) ABSTRACT

An information processing method and apparatus, a communication device, and a storage medium are provided. The information processing method applied to a base station may include: configuring configuration information of a reference signal according to the type of a user equipment (UE), where the reference signal includes at least one of a tracking reference signal (TRS) or a channel state information-reference signal (CSI-RS).

19 Claims, 5 Drawing Sheets

(51) Int. Cl.
*H04W 68/02* (2009.01)
*H04W 76/20* (2018.01)

(56) References Cited

U.S. PATENT DOCUMENTS

| | | | | |
|---|---|---|---|---|
| 2019/0363848 | A1 | 11/2019 | Sun et al. | |
| 2020/0374076 | A1* | 11/2020 | Wang | H04L 5/0053 |
| 2021/0144029 | A1 | 5/2021 | Wang et al. | |
| 2022/0086826 | A1* | 3/2022 | Huang | H04L 5/0091 |
| 2023/0319946 | A1* | 10/2023 | Wang | H04W 52/0235 370/329 |
| 2024/0015741 | A1* | 1/2024 | Tsai | H04L 25/0204 |
| 2024/0072865 | A1* | 2/2024 | Khan Beigi | H04L 25/0228 |
| 2024/0163052 | A1* | 5/2024 | Li | H04L 5/0051 |

FOREIGN PATENT DOCUMENTS

| | | | | | |
|---|---|---|---|---|---|
| CN | 108024267 | A | | 5/2018 | |
| CN | 108242985 | A | | 7/2018 | |
| CN | 109150431 | A | | 1/2019 | |
| CN | 109391986 | A | * | 2/2019 | H04L 5/0048 |
| CN | 110169130 | A | * | 8/2019 | H04J 11/0073 |
| CN | 110870241 | A | | 3/2020 | |
| CN | 111656813 | A | | 9/2020 | |
| WO | WO-2019157708 | A1 | * | 8/2019 | H04L 5/0053 |

OTHER PUBLICATIONS

Xiaomi Communications, "Discussion on TRS CSI-RS for RRC-IDLE and RRC-INACTIVE State UE", 3GPP TSG-RAN WG2 Meeting #112 electronic, R2-2008946, Online, Nov. 2-13, 2020, (6p).

International Search Report of PCT/CN2021/078777 dated Nov. 17, 2021 with English translation, (4p).

CMCC, "Discussion on TRS/CSI-RS occasion(s) for idle/inactive-mode UEs", 3GPP TSG RAN WG1 #103-e R1-2008022 e-Meeting, Oct. 26-Nov. 13, 2020, (4p).

* cited by examiner

S110: Configuring configuration information of a reference signal based on the type of user equipment UE, where the reference signal includes at least one of the following: TRS; CSI-RS.

INFORMATION PROCESSING METHOD AND APPARATUS, COMMUNICATION DEVICE, AND STORAGE MEDIUM

CROSS-REFERENCE OF RELATED APPLICATION

The present application is the U.S. National Stage of International Application No. PCT/CN2021/078777, filed on Mar. 2, 2021, the contents of all of which are incorporated herein by reference in their entireties for all purposes.

TECHNICAL FIELD

This disclosure relates to the field of wireless communication technology, but is not limited to it, in particular to an information processing method and apparatus, communication device, and storage medium.

BACKGROUND

In the wireless communication process between the base station and user equipment (UE), various reference signals are used, which can be used to achieve synchronization between the base station and UE, radio resource management (RRM) measurement, or communication measurement, etc. For example, the above reference signals may include: Tracking Reference Signal (TRS), Channel State Information (CSI)—Reference Signal (RS). With the development of mobile communication technology, different types of UEs have been introduced for different communication needs, each with its own software and hardware characteristics and/or communication requirements. How to balance the unique characteristics and communication needs of various UEs is a further issue that needs to be addressed.

SUMMARY

The present disclosure provides an information processing method and apparatus, communication device, and storage medium.

According to a first aspect of the present disclosure, provided is an information processing method, applied to a base station. The method includes: configuring configuration information of a reference signal based on a type of user equipment (UE), where the reference signal includes at least one of the following: tracking reference signal (TRS); or channel state information-reference signal (CSI-RS).

According to a second aspect of the present disclosure, provided is an information processing method, applied to a UE. The method includes: receiving configuration information of a reference signal configured based on a type of the UE, where the reference signal includes at least one of the following: tracking reference signal (TRS); or channel state information-reference signal (CSI-RS).

According to a third aspect of the present disclosure, provided is an information processing device, applied to a base station. The device includes: a configuration module for configuring configuration information of a reference signal based on a type of user equipment UE, where the reference signal includes at least one of the following: tracking reference signal (TRS); or channel state information-reference signal (CSI-RS).

According to a fourth aspect of the present disclosure, provided is an information processing device, applied to a UE. The device includes: a receiving module configured to receive configuration information of a reference signal configured based on a type of the UE, where the reference signal includes at least one of the following: tracking reference signal (TRS); or channel state information-reference signal (CSI-RS).

According to a fifth aspect of the present disclosure, provided is a communication device including a processor, a transceiver, a memory, and an executable program stored on the memory and capable of being run by the processor, wherein the processor executes the method provided in the first aspect or the second aspect mentioned above when running the executable program.

According to the sixth aspect of the present disclosure, provided is a non-transitory computer storage medium that stores executable programs; after the executable program being executed by the processor, the method provided in the first aspect or the second aspect mentioned above is implemented.

It should be understood that the general description above and the detailed description in the following text are only illustrative and explanatory, and do not limit the embodiments of the disclosure.

BRIEF DESCRIPTION OF THE DRAWINGS

The accompanying drawings here are incorporated into the specification and form a part of this specification, showing embodiments in accordance with the present disclosure and used together with the specification to explain the principles of the embodiments of the present disclosure.

DETAILED DESCRIPTION

Figures 1, 2:
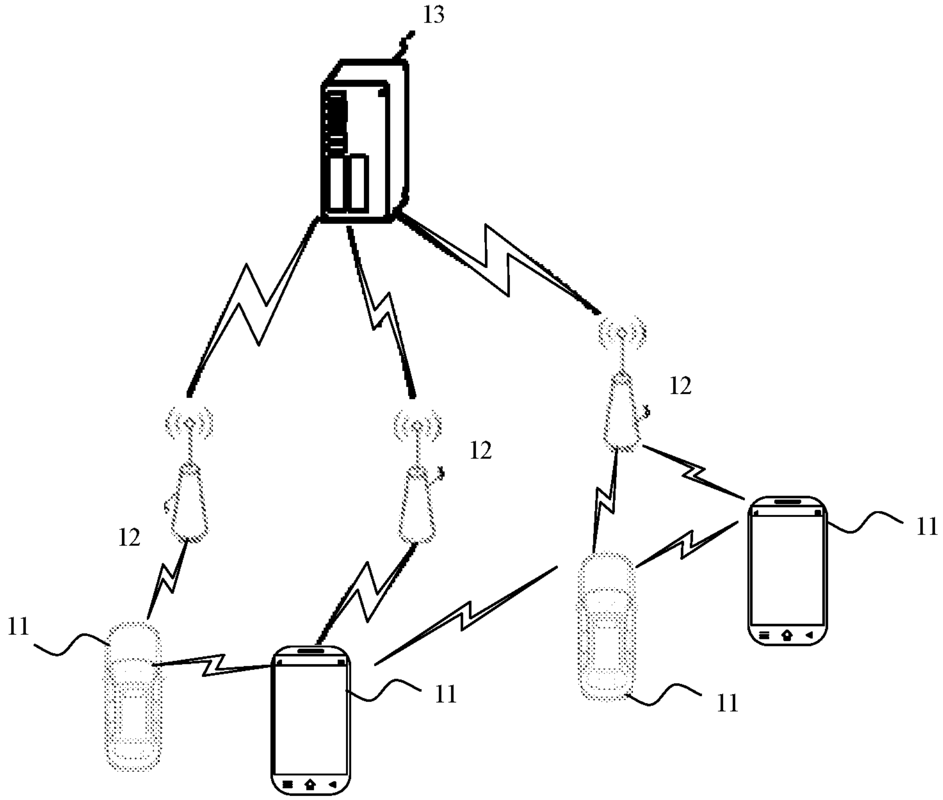
FIG. 1 is a schematic diagram of the structure of a wireless communication system according to an example.
FIG. 2 is a flowchart illustrating an information processing method according to an example.

Here, a detailed explanation will be given of examples, which are illustrated in the accompanying drawings. When the following description refers to the accompanying drawings, unless otherwise indicated, the same numbers in different drawings represent the same or similar elements. The embodiments described in the following examples do not represent all embodiments that are consistent with the embodiments of the present disclosure. On the contrary, they are only examples of devices and methods that are consistent with some aspects of the embodiments of the present disclosure as detailed in the attached claims.

The terms used in the embodiments of the disclosure are solely for the purpose of describing specific embodiments, and are not intended to limit the embodiments of the disclosure. The singular forms of “one”, “a/an,” “said,” and “the” used in the embodiments of the disclosure and the accompanying claims are also intended to include the majority form, unless the context clearly indicates other meanings. It should also be understood that the term "and/or" used herein refers to and includes any or all possible combinations of one or more related listed items.

It should be understood that although the terms first, second, third, etc. may be used to describe various information in the embodiments of the disclosure, such information should not be limited to these terms. These terms are only used to distinguish the same type of information from each other. For example, without departing from the scope of the embodiments of the disclosure, the first information can also be referred to as the second information, and similarly, the second information can also be referred to as the first information. Depending on the context, the word "if" used here can be interpreted as "at" or "when" or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. According to one aspect of the present disclosure, there is provided an information processing method, applied to a base station, including: configuring configuration information of a reference signal based on a type of user equipment UE, wherein the reference signal includes at least one of the following: tracking reference signal TRS; channel state information-reference signal CSI-RS.

For example, the reference signal is used for time-frequency domain synchronization between the UE in idle state or inactive state and the base station; and/or, the reference signal is used for wireless resource management RRM measurement of the UE in idle state or inactive state.

For example, the UE at least includes: a first type UE; a second type UE; wherein a bandwidth supported by the first type UE is greater than a bandwidth of the second type UE.

For example, the configuration information of the reference signal is also used for phase tracking and/or channel state information acquisition of the UE in connected state; the UE in connected state includes: the first type UE in connected state and/or the second type UE in connected state; or the configuration information of the reference signal for the second type UE is not used for phase tracking and/or channel state information acquisition of the UE in connected state.

For example, the first type UE is an enhanced mobile broadband eMBB UE; and the second type UE is a reduced capability Redcap UE.

For example, wherein the configuration information of the reference signal is for the first type UE in connected state and the second type UE in connected state; or the configuration information of the reference signal is for the first type UE in connected state; or the configuration information of the reference signal is for the second type UE in connected state.

For example, the configuration information of the reference signal includes: a set of reference signal configurations shared by the first type UE and the second type UE.

For example, in response to the first type UE and the second type UE sharing a same downlink initial bandwidth part BWP, the first type UE and the second type UE share the set of reference signal configurations.

For example, said configuring the configuration information of the reference signal based on the type of the UE includes: determining the configuration information of the reference signal based on the second type UE in response to the first type UE and the second type UE sharing the set of reference signal configurations; or determining the configuration information of the reference signal based on the first type UE in response to the first type UE and the second type UE sharing the set of reference signal configurations, wherein the configuration information of the reference signal is used by the second type UE to select a part of the bandwidth supported by the second type UE to monitor the reference signal within a bandwidth range of the reference signal.

For example, a change in the configuration information of the reference signal is active for the first type UE and the second type UE in response to the first type UE and the second type UE sharing the set of reference signal configurations.

For example, an availability indication of the reference signal acts on the first type UE and the second type UE.

For example, the configuration information of the reference signal includes: a reference signal configuration for the first type UE and a reference signal configuration for the second type UE; wherein the reference signal configuration for the first type UE is at least partially different from the reference signal configuration for the second type UE.

For example, said configuring the configuration information of the reference signal based on the type of the UE includes: correlatively configuring the reference signal configuration for the first type UE and the reference signal configuration for the second type UE based on the first type UE and the second type UE in response to the configuration information of the reference signal including the reference signal configuration for the first type UE and the reference signal configuration for the second type UE.

For example, said correlatively configuring the reference signal configuration for the first type UE and the reference signal configuration for the second type UE based on the first type UE and the second type UE in response to the configuration information of the reference signal including the reference signal configuration for the first type UE and the reference signal configuration for the second type UE includes: a frequency range of the reference signal for the second type UE is within a frequency range of the reference signal for the first type UE in response to the configuration information of the reference signal including the reference signal configuration for the first type UE and the reference signal configuration for the second type UE; and/or, a second cycle of the reference signal for the second type UE is N times of a first cycle of the reference signal for the first type UE in response to the configuration information of the reference signal including the reference signal configuration for the first type UE and the reference signal configuration for the second type UE, wherein N is a positive integer.

For example, said correlatively configuring the reference signal configuration for the first type UE and the reference signal configuration for the first type UE includes: correlatively configuring the reference signal configuration for the first type UE and the reference signal configuration for the first type UE in response to the first type UE and the second type UE using a same downlink initial BWP.

For example, a change in the reference signal configuration for the first type UE is active for the first type UE and the second type UE; and/or a change in the reference signal configuration for the second type UE is active for the second type UE.

For example, an availability indication of the reference signal for the second type UE is active for the first type UE and the second type UE; and/or the availability indication of the reference signal for the second type UE is active for the second type UE.

For example, said configuring the configuration information of the reference signal based on the type of the UE includes: configuring the reference signal configuration for the first type UE and the reference signal configuration for the second type UE respectively in response to the configuration information of the reference signal including the reference signal configuration for the first type UE and the reference signal configuration for the second type UE.

For example, said configuring the reference signal configuration for the first type UE and the reference signal configuration for the second type UE respectively includes at least one of the following: configuring a frequency range of the reference signal for the first type UE based on the bandwidth supported by the first type UE, and configuring a frequency range of the reference signal for the second type UE based on the bandwidth supported by the second type UE; configuring a cycle of the reference signal for the first type UE and a cycle of the reference signal for the second type UE respectively; configuring a time domain offset of the reference signal for the first type UE from a paging occasion PO in time domain based on a time domain offset supported by the first type UE; configuring a time domain offset of the reference signal for the second type UE from the PO in the time domain based on a time domain offset supported by the second type UE; configuring a time domain offset of the reference signal for the first type UE from a paging occasion PO in time domain based on a time domain offset supported by the first type UE; configuring a time domain offset of the reference signal for the second type UE from the PO in the time domain based on a time domain offset supported by the second type UE.

For example, a frequency domain offset of the reference signal for the first type UE from the PO is smaller than a frequency domain offset of the reference signal for the second type UE from the PO in frequency domain.

For example, said configuring the configuration information of the reference signal based on the type of the UE includes: configuring the reference signal configuration for the first type UE and the reference signal configuration for the second type UE respectively in response to initial downlink initial BWPs of the first type UE and the second type UE being different.

For example, a change in the reference signal configuration for the first type UE is active for the first type UE; a change in reference signal configuration for the second type UE is active for the second type UE.

For example, an availability indication of the reference signal for the first type UE is active for the first type UE; an availability indication of the reference signal for the second type UE is active for the second type UE.

For example, the method further includes: receiving auxiliary information; said configuring the configuration information of the reference signal based on the type of the UE includes: configuring the configuration information of the reference signal based on the type of the UE and the auxiliary information.

For example, the auxiliary information indicates at least one of the following: whether the UE support use of reference signals for the UE in idle state and/or inactive state; a time domain offset between the reference signal and PO supported by UE.

For example, said receiving the auxiliary information includes: receiving the auxiliary information in response to a protocol not specifying use of the reference signal for the UE in idle state or inactive state; or receiving the auxiliary information in response to a protocol not specifying that use of the reference signal for the UE in idle state or inactive state is a mandatory function.

For example, the auxiliary information is carried and reported in a UE capability message.

According to another aspect of the present disclosure, there is provided an information processing method, applied to UE, including: receiving configuration information of a reference signal configured based on a type of the UE, wherein the reference signal includes at least one of the following: tracking reference signal TRS; channel state information-reference signal CSI-RS.

For example, the reference signal is used for time-frequency domain synchronization between the UE in idle state or inactive state and the base station; and/or, the reference signal is used for wireless resource management RRM measurement of the UE in idle state or inactive state.

For example, the UE at least includes: a first type UE; a second type UE; wherein a bandwidth supported by the first type UE is greater than a bandwidth of the second type UE.

For example, the configuration information of the reference signal is also used for phase tracking and/or channel state information acquisition of the UE in connected state; the UE in connected state includes: the first type UE in connected state and/or the second type UE in connected state; or the configuration information of the reference signal for the second type UE is not used for phase tracking and/or channel state information acquisition of the UE in connected state.

For example, the first type UE is an enhanced mobile broadband eMBB UE; and/or, the second type UE is a reduced capability Redcap UE.

For example, the configuration information of the reference signal is for the first type UE in connected state and the second type UE in connected state; or the configuration information of the reference signal is for the first type UE in connected state; or the configuration information of the reference signal is for the second type UE in connected state.

For example, the configuration information of the reference signal includes: a set of reference signal configurations shared by the first type UE and the second type UE.

For example, in response to the first type UE and the second type UE sharing a same BWP, the first type UE and the second type UE share the set of reference signal configurations.

For example, the configuration information is determined based on the second type UE in response to the first type UE and the second type UE sharing the set of reference signal configurations; or the configuration information is determined based on the first type UE in response to the first type UE and the second type UE sharing the set of reference signal configurations, wherein the configuration information of the reference signal is used by the second type UE to select a part of a bandwidth supported by the second type UE to monitor the reference signal within a bandwidth range of the reference signal.

For example, a change in the configuration information of the reference signal is active for the first type UE and the second type UE in response to the first type UE and the second type UE sharing the set of reference signal configurations.

For example, an availability indication of the reference signal acts on the first type UE and the second type UE.

For example, the configuration information of the reference signal includes: a reference signal configuration for the first type UE and a reference signal configuration for the second type UE; wherein the reference signal configuration for the first type UE is at least partially different from the reference signal configuration for the second type UE.

For example, the configuration information is configured correlatively based on types of the first type UE and the second type UE in response to the configuration information of the reference signal including the reference signal configuration for the first type UE and the reference signal configuration for the first type UE.

For example, a frequency range of the reference signal for the second type UE is within a frequency range of the reference signal for the first type UE in response to the configuration information of the reference signal including the reference signal configuration for the first type UE and the reference signal configuration for the first type UE; and/or, a second cycle of the reference signal for the second type UE is N times of a first cycle of the reference signal for the first type UE in response to the configuration information of the reference signal including the reference signal configuration for the first type UE and the reference signal configuration for the first type UE, wherein N is a positive integer.

For example, a change in reference signal configuration for the first type UE is active for the first type UE and the second type UE; and/or, a change in reference signal configuration for the second type UE is active for the second type UE.

For example, an availability indication of the reference signal for the first type UE is active for the first type UE and the second type UE; and/or, an availability indication of the reference signal for the second type UE is active for the second type UE.

For example, the configuration information is configured according to types of the first type UE and the second type UE respectively in response to the configuration information of the reference signal including a reference signal configuration for the first type UE and a reference signal configuration for the second type UE.

For example, a change in the reference signal configuration for the first type UE is active for the first type UE; a change in the reference signal configuration for the second type UE is active for the second type UE.

For example, an availability indication of the reference signal for the first type UE is active for the first type UE; an availability indication of the reference signal for the second type UE is active for the second type UE.

For example, the method further includes: sending auxiliary information; wherein the auxiliary information is used by the base station to configure the configuration information of the reference signal.

For example, the auxiliary information indicates at least one of the following: whether the UE support use of the reference signal in the UE in idle state and/or inactive UE state; a time domain offset between the reference signal and PO supported by UE.

For example, said receiving the auxiliary information includes: sending the auxiliary information in response to a protocol not specifying use of the reference signal for the UE in idle state and/or inactive state; or sending the auxiliary information in response to a protocol not specifying that use of the reference signal for the UE in idle state and/or inactive state is a mandatory function.

For example, the auxiliary information is carried in a UE capability message.

For example, the method further includes: receiving the reference signal by frequency hopping based on the configuration information.

For example, said receiving the reference signal by frequency hopping based on the configuration information includes: receiving the reference signal by frequency hopping based on the configuration information in response to a distance between a frequency domain position of the reference signal and a frequency domain position of a center frequency point of SSB being greater than a preset value.

According to another aspect of the disclosure, there is provided an information processing device, applied to a base station, including: a configuration module for configuring configuration information of a reference signal based on a type of user equipment UE, wherein the reference signal includes at least one of the following: tracking reference signal TRS; channel state information-reference signal CSI-RS.

For example, the reference signal is used for time-frequency domain synchronization between the UE in idle state or inactive state and the base station; and/or, the reference signal is used for wireless resource management RRM measurement of the UE in idle state or inactive state.

For example, the UE at least includes: a first type UE; a second type UE; wherein a bandwidth supported by the first type UE is greater than a bandwidth of the second type UE.

According to another aspect of the disclosure, there is provided an information processing device, applied to UE, including: a receiving module configured to receive configuration information of a reference signal configured based on a type of the UE, wherein the reference signal includes at least one of the following: tracking reference signal TRS; channel state information-reference signal CSI-RS.

For example, the reference signal is used for time-frequency domain synchronization between the UE in idle state or inactive state and the base station; and/or, the reference signal is used for wireless resource management RRM measurement of the UE in idle state or inactive state.

For example, the UE at least includes: a first type UE; a second type UE; wherein a bandwidth supported by the first type UE is greater than a bandwidth of the second type UE.

According to another aspect of the present disclosure, there is provided a communication device including a processor, a transceiver, a memory, and an executable program stored on the memory and capable of being run by the processor, wherein the processor executes the above mentioned method when running the executable program.

According to another aspect of the present disclosure, there is provided a computer storage medium that stores executable programs; after the executable program being executed by the processor, the above mentioned method is implemented.

Please refer to FIG. 1, which shows a schematic diagram of the structure of a wireless communication system provided by an embodiment of the disclosure. As shown in FIG.

1, the wireless communication system is a communication system based on cellular mobile communication technology, which can include several UE11 and several access devices 12.

Among them, UE11 can be a device that provides voice and/or data connectivity to users. UE11 can communicate with one or more core networks through a Radio Access Network (RAN). UE11 can be an IoT UE, such as a sensor device, a mobile phone (or "cellular" phone), and a computer with IoT UE, such as fixed, portable, pocket, handheld, computer built-in, or in-vehicle device. For example, UE11 can be station (STA), subscriber unit, subscriber station, mobile station, mobile, remote station, access point, remote UE (remote terminal), access UE (access terminal), user terminal, user agent, user device, or user equipment (UE). Alternatively, UE11 can also be a device for unmanned aerial vehicles. Alternatively, UE11 can also be an onboard device, such as a trip computer with wireless communication function or a wireless communication device externally connected to the trip computer. Alternatively, UE11 can also be a roadside device, such as a street light, signal light, or other roadside device with wireless communication function.

The access device 12 can be a network-side device in a wireless communication system. Among them, the wireless communication system can be the fourth generation mobile communication (4G) system, also known as Long Term Evolution (LTE) system. Alternatively, the wireless communication system can also be a 5G system, also known as a new radio (NR) system or a 5G NR system. Alternatively, the wireless communication system can also be the next generation system of the 5G system. Among them, the access network in the 5G system can be called NG-RAN (New Generation-Radio Access Network). Alternatively, the wireless communication system can also be a MTC system.

Among them, access device 12 can be an evolutionary access device (eNB) used in 4G systems. Alternatively, the access device 12 can also be an access device (gNB) adopting centralized distributed architecture in a 5G system. When the access device 12 adopts a centralized distributed architecture, it usually includes a central unit (CU) and at least two distributed units (DU). The centralized unit is equipped with a protocol stack including Packet Data Convergence Protocol (PDCP) layer, Radio Link Control (RLC) layer, and Media Access Control (MAC) layer. The distribution unit is equipped with a protocol stack of physical (PHY) layer. The specific implementation of the access device 12 is not limited in the embodiment of the disclosure.

Wireless connection can be established between access device 12 and UE11 through radio. In different embodiments, the radio is based on the fourth generation mobile communication network technology (4G) standard. Alternatively, the radio is based on the fifth generation mobile communication network technology (5G) standard, such as a new radio. Alternatively, the radio can also be based on the next generation mobile communication network technology standard of 5G.

In some embodiments, an E2E (End to End) connection can also be established between UE11. For example, E2E (End to End) connection can be applied in scenarios such as V2V (vehicle to vehicle) communication, V2I (vehicle to infrastructure) communication, and V2P (vehicle to pedestrian) communication in Vehicle to Everything (V2X) communication.

In some embodiments, the wireless communication system mentioned above may also include a network management device 13.

Several access devices 12 are respectively connected to the network management device 13. The network management device 13 can be a core network device in the wireless communication system. For example, the network management device 13 can be a Mobility Management Entity (MME) in the Evolved Packet Core (EPC). Alternatively, the network management device can also be other core network device, such as a Service GateWay (SGW), Public Data Network GateWay (PGW), Policy and Charging Rules Function (PCRF), or Home Subscriber Server (HSS). The implementation of the network management device 13 is not limited in the embodiment of the disclosure.

As shown in FIG. 2, according to the embodiment of the disclosure, it provides an information processing method applied to a base station, including:

S110: Configuring configuration information of a reference signal based on the type of user equipment UE, where the reference signal includes at least one of the following: TRS; CSI-RS.

In the embodiment of the disclosure, the configuration of the reference signal will be configured according to the type of UE. After the configuration information is configured, it will be sent to the UE for monitoring the reference signal based on the configuration information.

In one embodiment, the Type of UE can be divided based on the bandwidth supported by the UE. For example, some UEs support a large bandwidth, while others support a relatively small bandwidth.

In one embodiment, the Type of UE can also be divided based on the capability of the UE. For example, transceivers of some UEs have high transmission rates, while others have relatively low transmission rates. For example, processors of some UEs have stronger processing capabilities, while others have weaker processing capabilities. UE with relatively weak processing capability requires longer time for signal encoding and decoding.

In one embodiment, the Type of UE can be divided based on the allowed standby duration. For example, IoT devices require low power consumption to achieve ultra-long standby durations. However, UEs such as mobile phones have less power consumption limitations due to the possibility of users charging them.

Different types of UEs have different requirements for the reception and/or use of reference signals. In order to configure reference signals suitable for different types of UEs, in the embodiment of the disclosure, the configuration information of the reference signal will be configured based on the Type of UE.

In some embodiments, S110 may include configuring configuration information for a non-connected state UE based on the Type of UE. The non-connected state UE at least includes: idle state UE and/or inactive state UE.

In view of this, in one embodiment, the reference signal may be any reference signal originally configured for the connected-state UE. The reference signal can be a non-newly introduced signal, and can be any reference signal already configured in the related art, thus having strong compatibility with the related art.

In the embodiment of the disclosure, in the process of determining the configuration information of the reference signal, considering the configuration information of the reference signal to be used by the non-connected state UE, it is necessary to consider the characteristics of the non-connected state, and further configure the configuration information of the reference signal based on the Type of UE, where the configuration information of the reference signal can be suitable for the use by UE in any state of the non-connected state and the connected state.

Of course, in another embodiment, the reference signal may be a reference signal separately configured for use by a non-connected state UE.

The reference signal at least includes: TRS and/or CSI-RS.

In one embodiment, the reference signal may be a reference signal that originally has a first function. In the embodiment of the disclosure, the reference signal can also be used for a second function. The second function may differ from the first function.

For example, the TRS is originally intended to be used for UE phase tracking; and CSI-RS can be used to obtain channel state information.

In the embodiment of the disclosure, the initial first function of the TRS as the reference signal can be: phase tracking; and the initial first function of CSI-RS as the reference signal can be used for obtaining channel state information. The second function of TRS can include: adjustment of Automatic Gain Control (AGC) for UE, Radio Resource Management (RRM) for UE, and/or time-frequency domain synchronization between UE and base station. Similarly, the second function of the CSI-RS can also include: AGC amplification for UE, RRM for UE, and/or time-frequency domain synchronization between UE and base station. In the embodiment of the disclosure, the time-frequency domain synchronization may include: time-domain synchronization between UE and base station, and/or alignment between UE and base station in the frequency domain.

In summary, in the embodiment of the disclosure, the configuration information of the reference signal configured according to the Type of UE will be tailored to the specific UE of the corresponding type, so that the reference signal will be suitable for the characteristics required by the UE to perform the corresponding function.

The configuration information of the reference signal includes at least one of the following: resource allocation of the reference signal; sequence configuration of the reference signal, such as the sequence configuration of the reference signal, the sequence generation parameter of the reference signal, etc.; quasi colocation (QCL) configuration of the reference signal, and the QCL configuration at least includes QCL parameter; number configuration of the reference signal; cycle configuration of the reference signal; functional configuration of reference signal, for example, the functional configuration indicates whether it is used for the second function and/or which specific sub-function is used in the second function; active configuration of the preset reference signal, such as the active configuration of the reference signal, which can be used to indicate the active conditions and/or active occasion of the configuration information for the configuration of the reference signal; the offset configuration between the reference signal and other reference signals, which can include: offset configuration in the time domain and/or offset configuration in the frequency domain.

Of course, the above is only an example of the configuration information of the reference signal. When implementing it, the specific content of the configuration information is not limited to the above examples.

In another embodiment, the reference signal can be used for time-frequency domain synchronization between UE in idle or inactive state and the base station. Alternatively, the reference signal can be used for wireless resource management RRM measurement of UE in idle or inactive state.

In some embodiments, the TRS/CSI-RS can be used for time-frequency domain synchronization between non-connected state UE and base stations. In related art, reference signals used for time-frequency domain synchronization between UE and base stations can include Synchronization Signal and PBCH block (SSB). PBCH is the abbreviation for Physical Broadcast Channel.

Due to the flexibility of TRS/CSI-RS configuration, it is possible to configure TRS/CSI-RS, which is equivalent to SSB, to be closer to the paging occasion (PO) of UE in the time and frequency domain. In this way, UE in low power inactive or idle state wakes up at the PO to monitor paging message while also monitoring reference signal, thereby reducing the number of SSB being monitored, reducing the phenomenon of high power consumption caused by multiple awakenings or longer duration of one awakening, and further saving the power consumption of UE.

In some embodiments, UE can enter a discontinuous reception (DRX) state, in which UE switches between connected and non-connected states according to the DRX cycle or extended DRX cycle. The DRX cycle and/or eDRX cycle are respectively set with wake-up time and sleep time. UE is in a non-connected state during the sleep time, and UE is in a connected state during the wake-up time. Usually, UE needs to enter the connected state to monitor signals such as PDCCH or PO or SSB to maintain time-frequency domain synchronization with the base station. Therefore, in the embodiment of the disclosure, TRS/CSI-RS is used to replace other reference signals with more limited design on SSB in the time-frequency domain for UE to synchronize with the base station in the time-frequency domain. The time-frequency domain position of the reference signal can be flexibly configured according to the type of UE, in order to save power consumption of UE, etc.

In another embodiment, the reference signal can also be used to replace at least some SSBs as RRM measurement, which can also reduce the duration or frequency of UE entering the connected state of high power consumption, thereby saving UE power consumption.

In some embodiments, UE at least includes: a first type UE and/or a second type UE. The bandwidth supported by the first type UE is greater than the bandwidth of the second type UE. The types of UE include: a first type and a second type. The first type of UE is the first type UE. The second type of UE is the second type UE.

For example, the first type UE may be an enhanced Mobile Broadband (eMBB) UE, and the second type UE may be a Redcap UE.

For example, the type of UE may not be limited to the first type UE and the second type UE, but may also include a third type UE, etc.

In some embodiments, the configuration information of the reference signal is also used for phase tracking and/or obtaining channel state information of UE in connected state. The UE in connected state includes: the first type UE of the connected state and/or the second type UE of the connected state.

At this point, the configuration information of the reference signal is used for both connected state UE and unconnected state UE. This is equivalent to sharing a set of configurations of reference signal between connected state UE and unconnected state UE, which at least improves the effective utilization rate of the time-frequency resources consumed by the reference signal.

In some embodiments, if the configuration information of the reference signal is targeted at both connected state UE and non-connected state UE; if all UEs in a certain connected state are cut out of the cell, the network side can reclaim the resource configuration of the reference signal. In this way, the resource configuration of the reference signal will affect the use of the reference signal by the corresponding type of non-connected state UEs. By way of example, at this point, the base station can configure the reference signal only for non-connected UE based on the Type of UE.

In another embodiment, at least configuration information of the reference signal for the second type UE is not used for phase tracking and/or channel state information acquisition of the connected state UE.

The bandwidth supported by the second type UE is smaller than that of the first type UE. For example, the maximum bandwidth supported by the second type UE can be 20 M, while the maximum bandwidth supported by the first type UE can be up to 100 M. For the reference signal of the second type UE, it may be not necessary to use the first type UE. For the configuration of the reference signal of the second type UE, at least the occupied frequency domain resources are relatively small. The reference signal for the second type UE in the configuration information of the reference signal can be configured, such that it can only be applied to the second type UE in the non-connected state and not to the first type UE in the non-connected state; alternatively, it is only applied to the first type UE in the non-connected state and/or the second type UE in the non-connected state, and not to the first type UE in the non-connected state.

Regarding the configuration of the reference signal for the first type UE and/or the second type UE in the configuration information, whether it can be used for UE in connected state or which type of UE in connected state it is suitable can be determined comprehensively based on the network environment and/or network capacity and/or UE access quantity, and the configuration of the reference signal can be determined comprehensively based on the network environment and/or network capacity and/or UE access quantity.

In one embodiment, the first type UE is an Enhanced Mobile Band (eMBB) UE; and/or, the second type UE is a Reduced Capability (Redcap) UE.

In one embodiment, the configuration information of the reference signal is used for the first type UE in the connected state and the second type UE in the connected state. Alternatively, the configuration information of the reference signal is used for the first type UE in the connected state. Alternatively, the configuration information of the reference signal is used for the second type UE in the connected state.

Here, the configuration information is for the first type UE of the connected state and the second type UE of the connected state, indicating the reference signal corresponding to the configuration information is used for the first type UE of the connected state and the second type UE of the connected state. Similarly, the configuration information is for the first type UE of the connected state, indicating the reference signal corresponding to the configuration information is used for the first type UE of the connected state. The configuration information is for the second type UE of the connected state, indicating the reference signal corresponding to the configuration information is used for the second type UE of the connected state.

In some embodiments, the configuration information of the reference signal includes: a set of reference signal configurations shared by the first type UE and the second type UE.

The configuration information includes reference signal configuration, which includes but is not limited to the aforementioned resource configuration and other configuration.

If the first type UE and the second type UE share the same set of reference signal configuration, it indicates that the current configuration mode of the preset reference signal configuration is common configuration.

If the first type UE and the second type UE share the same set of reference signal configuration, the first type UE and the second type UE will receive the reference signal on the same time-frequency domain resources. In order to reduce unnecessary BWP switching for at least one UE, in one embodiment, in response to the first type UE and the second type UE sharing the same downlink initial BWP, the first type UE and the second type UE share a set of reference signal configurations. Of course, if the first type UE and the second type UE do not share the same downlink initial BWP, then at least one UE may need to switch to the working BWP when monitoring the reference signal.

In some embodiments, the S110 may include: in response to the first type UE and the second type UE sharing a set of configuration of the reference signal, determining the configuration information of the reference signal based on the second type UE.

Due to the fact that the bandwidth supported by the second type UE is smaller than that supported by the first type UE, in order to make the configured reference signal supported by the second type UE, the reference signal configuration can be directly performed based on the second type UE to obtain the configuration information of the reference signal. For example, the reference signal is configured based on the bandwidth supported by the second type UE; and/or, the reference signal or the like is configured based on the distribution position of the PO of the second type UE in the time domain.

In another embodiment, in response to the first type UE and the second type UE sharing a set of reference signal configurations, the configuration information of the reference signal is determined based on the first type UE, wherein the configuration information of the reference signal is used by the second type UE to select a part of the bandwidth supported by the second type UE within the bandwidth range of the reference signal to monitor the reference signal.

In the embodiment of the disclosure, according to the second type UE, configuring the configuration information of the reference signal includes but is not limited to: configuring the configuration information of the reference signal based on the bandwidth supported by the first type UE; and/or, configuring the configuration information of the reference signal based on the distribution position of the PO of the first type UE in the time domain.

If the configuration information of the reference signal is configured based on the bandwidth supported by the first type UE, then the transmission bandwidth of the reference signal can be the bandwidth supported by the first type UE. The bandwidth supported by the second type UE is smaller than that supported by the first type UE. At this time, the first type UE can truncate the bandwidth of the reference signal based on its own supported bandwidth and receive it.

For example, assuming the reference signal is configured at [A+BW1/2, A−BW1/2], BW1 can be the bandwidth supported by the first type UE; and the second type UE supports a bandwidth of BW2, which is smaller than BW1. In this case, any continuously distributed BW2 can be selected to receive the reference signal at [A+BW1/2, A−BW1/2], and the first function and/or the second function of the reference signal can be executed based on the received reference signal. For example, the second type of UE can choose to receive the reference signal on A+BW1/2 to A+BW1/2−BW1; alternatively, the second type of UE can choose to receive the reference signal on A+−BW1/2 to A+−BW1/2+BW1. Of course, this is only an example, and the specific implementation is not limited to this.

In one embodiment, in response to the first type UE and the second type UE sharing a set of reference signal configurations, changes in the configuration information of the reference signal are active for the first type UE and the second type UE.

Due to the first type UE and the second type UE sharing a set of reference signal configurations in the common configuration mode, changes in configuration information can be active simultaneously for both the first type UE and the second type UE. Therefore, the reference signal configurations of the first type UE and the second type UE that share a set of reference signal configurations can be active simultaneously.

In some embodiments, the availability indication of the reference signal acts on the first type UE and the second type UE.

After the reference signal is configured, the network side may also issue availability indication according to specific needs. This availability indication indicates whether the reference signal corresponding to the configuration information is available. If a reference signal is not available, there may be at least one of the following situations: the reference signal configuration is unreasonable, the resource of the reference signal is occupied, and the base station does not expect UE to use the reference signal. The reference signal configuration being unreasonable includes but is not limited to at least one of the following: the configured frequency domain position is too far away from the working BWP used by the UE, the configured density of the reference signal is unreasonable, the distribution of the reference signal in the time domain does not meet the service transmission needs of the UE or the purpose of saving power consumption of the UE, etc. Of course, the above is only an explanation of the unreasonable configuration of the reference signal, and the specific implementation is not limited to this.

There are some urgent services, such as Ultra reliable and low latency communication (URLLC) service seizing the transmission resource of reference signal, resulting in unavailability of the reference signal.

By availability, it can at least indicate whether the reference signal corresponding to the configuration information is available. If it is not available, the UE can avoid monitoring the reference signal based on the configuration information, thereby reducing unnecessary monitoring.

In some embodiments, the configuration information of the reference signal includes: a reference signal configuration for the first type UE and a reference signal configuration for the second type UE, where the reference signal configuration for the first type UE is at least partially different from the reference signal configuration for the second type UE.

If the first type UE and the second type UE share the same set of reference signal configurations, the availability indication is active for both the first type UE and the second type UE. Therefore, the base station only needs to issue an availability indication once to indicate whether the reference signals corresponding to the configuration information of the two types of UEs are available, which has the characteristic of low indication bit overhead.

In one embodiment, the S110 may include: correlatively configuring the reference signal configuration for the first type UE and the reference signal configuration for the second type UE based on the first type UE and the second type UE, in response to the configuration information corresponding to the reference signal including the reference signal configuration for the first type UE and the reference signal configuration for the second type UE.

Another configuration mode of the reference signal configuration for the first type UE and the second type UE may include: correlation configuration.

In one embodiment, by correlatively configuring the reference signal configuration for the first type UE and the reference signal configuration for the second type UE, two sets of reference signal configurations acting on the first type UE and the second type UE are obtained, respectively. It is to be noted that these two sets of reference signal configurations are related configurations from a configuration perspective; and these two sets of reference signal configurations have partially identical configuration information, or the partial configuration information of the reference signal is correlated from a perspective of configuration result to the reference signal.

The reference signal configuration for the first type UE and the reference signal configuration for the second type UE are configured in the correlation configuration mode. To reduce signaling overhead, the reference signal configurations for the first type UE and the second type UE can be issued together. Common bit can be used to indicate the same part of the reference signal configuration for the two types of UEs, while different bits can be used to indicate the different part of the reference signal configuration for the two types of UEs.

For example, correlatively configuring the reference signal configuration for the first type UE and the reference signal configuration for the second type UE based on the first type UE and the second type UE, in response to the configuration information corresponding to the reference signal including the reference signal configuration for the first type UE and the reference signal configuration for the second type UE, including: the frequency range of the reference signal for the second type UE is within the frequency range of the reference signal for the first type UE, in response to the configuration information of the reference signal including the reference signal configuration for the first type UE and the reference signal configuration for the second type UE; and/or, the second cycle of the reference signal for the second type UE is N times of the first cycle of the reference signal for the first type UE, in response to the configuration information of the reference signal including the reference signal configuration for the first type UE and the reference signal configuration for the second type UE, where N is a positive integer.

In one case, where the frequency range of transmitting the reference signal for the second type UE is within the frequency range of transmitting the reference signal for the first type UE, the correlation of configuration results obtained from this correlation configuration is reflected in the correlation of frequency domain resources.

In another case, where the cycle of transmitting the reference signal for the second type UE is N times of the cycle of transmitting the reference signal for the first type UE, the correlation of the configuration results of the correlation configuration is reflected in the transmission cycle of the reference signal.

The second cycle of the reference signal of the second type UE is N times of the first cycle, which allows the second type UE with weaker processing capability than the first type UE to have more time to process the reference signal, thereby obtaining more accurate measurement of the reference signal and better realizing the first function and/or second function of the reference signal.

In some embodiments, correlatively configuring the reference signal configuration for the first type UE and the reference signal configuration for the second type UE, including: correlatively configuring the reference signal configuration for the first type UE and the reference signal configuration for the second type UE in response to the first type UE and the second type UE using the same downlink initial BWP.

Due to correlation between the reference signal configuration for the first type UE and the reference signal configuration for the second type UE caused by correlation configuration, the BWP switching of at least one type UE when receiving the reference signal is reduced. Therefore, when the first type UE and the second type UE use the same downlink initial BWP, the reference signal configuration for the first type UE and the reference signal configuration for the second type UE are correlatively configured.

In some embodiments, changes in the reference signal configuration for the first type UE are active for the first type UE and the second type UE. Due to the correlation between the reference signal configuration of the first type UE and the reference signal configuration of the second type UE, considering that the bandwidth supported by the first type UE is greater than that supported by the second type UE, it is possible to consider a change in the reference signal for the first type UE, which simultaneously acts on both the first type UE and the second type UE, that is, simultaneously active for both the first type UE and the second type UE. This can be understood as: the first type UE and the second type UE need to synchronously update the reference signal configuration. For example, if the first type UE changes the frequency range of reference signal transmission, the second type UE will also synchronously change the frequency range of reference signal transmission. For example, if the first type UE changes the cycle of the reference signal, the second type UE will still synchronously change the cycle of the reference signal with the first type UE based on the multiple relationship of N.

In another embodiment, in the scenario of correlation configuration of the reference signal, changes to the reference signal configuration for the first type UE and the second type UE may only have one type, namely joint change; and this joint change will be active for both the first type UE and the second type UE.

In another embodiment, in the scenario of the correlation configuration of the reference signal, changes to the reference signal configuration for the first type UE and the second type UE may include individual change in addition to the joint change mentioned above. This individual change at least applies to the second type UE. For example, a change in the reference signal configuration for the second type UE is active for the second type UE. It can be understood that change in the reference signal configuration for the second type UE are only active for the second type UE and are inactive for the first type UE. If the base station issues a reference signal configuration for the second type UE, the first type UE will continue to maintain the original reference signal configuration after receiving it. After the second type UE receives the change, it will update the reference signal configuration for the second type UE based on the change.

In one embodiment, the availability indication of the reference signal for the first type UE is active for the first type UE and the second type UE. Alternatively, the availability indication of the reference signal for the second type UE is active for the second type UE.

In the correlation configuration mode, the correlation between the reference signal configuration for the first type UE and the reference signal configuration for the second type UE, and the frequency range of the reference signal transmission defined by the reference signal configuration for the second type UE is within the frequency range of the reference signal configuration for the first type UE, and the base station releases a certain resource as a whole. Therefore, the availability indication of the reference signal configuration for the first type UE is active for the first type UE, and it also needs to be active for the second type UE due to the full release of resources.

Similarly, the availability configuration of the reference signal separately for the second type UE can only be active for the second type UE, but inactive for the first type UE.

In one embodiment, configuring the configuration information of the reference signal based on the user equipment UE type, including: respectively configuring the reference signal configuration for the first type UE and the reference signal configuration for the second type UE in response to the configuration information of the reference signal including the reference signal configuration for the first type UE and the reference signal configuration for the second type UE.

In another embodiment, the reference signal configuration for the first type UE and the reference signal configuration for the second type UE can be configured separately. At this point, it is necessary to separately configure the reference signal configuration for the first type UE and the reference signal configuration for the second type UE respectively based on the first type UE and the second type UE.

The reference signal configuration for the first type UE and the reference signal configuration for the second type UE are configured respectively. The adopted configuration mode is individual configuration or separate configuration.

By using this mode to configure the reference signal configurations of the first type UE and the second type UE separately, it is equivalent to configure the reference signal configuration of the first type UE according to the characteristics of the first type UE, and configure the reference signal configuration of the second type UE according to the characteristics of the second type UE. In this way, by using this separate configuration mode to configure the reference signal configurations of the first type UE and the second type UE respectively, the most suitable reference signal configurations for the current first type UE and the second type UE can be configured, and the reference signal configurations of the first type UE and the second type UE can be scheduled with maximum flexibility.

In some embodiments, configuring the reference signal configuration for the first type UE and the reference signal configuration for the second type UE respectively including at least one of the following: configuring the frequency range of the reference signal of the first type UE based on the bandwidth supported by the first type UE, and configuring the frequency range of the reference signal of the second type UE based on the bandwidth supported by the second type UE; configuring the cycle of the reference signal for the first type UE and the cycle of the reference signal for the second type UE respectively; configuring the time domain offset of the reference signal for the first type UE from the paging occasion PO in the time domain according to the time domain offset supported by the first type UE; configuring the time domain offset of the reference signal for the second type UE from PO in the time domain according to the time domain offset supported by the second type UE.

The reference signal configuration for the first type UE and the reference signal configuration for the second type UE are configured separately. At this time, the first type UE and the second type UE can receive the reference signal in frequency domain positions without overlap or with partial overlap. The cycle of the reference signal configured for the first type UE and the cycle of the reference signal configured for the second type UE are different, which can include: the cycle of the reference signal for the first type UE is smaller than the cycle of the reference signal for the second type UE. In this way, the second type UE can obtain more reference signals in a shorter time, thereby achieving corresponding functions and saving power consumption of the second type UE.

In some embodiments, the time domain offset of the reference signal for the first type UE from the PO is smaller than the time domain offset of the reference signal for the second type UE from the PO. If the time offset between the first type UE and PO is larger, then the second type UE has enough time to process the reference signal and the received PO, reducing the backlog of signals to be decoded, etc.

The separate configuration mode can be used for situations where the initial BWPs of the downlink of the first type UE and the second type UE are the same or different.

In some embodiments, the S110 may include: configuring the reference signal configuration for the first type UE and the reference signal configuration for the second type UE respectively in response to the initial downlink BWPs of the first type UE and the second type UE being different.

In some embodiments, a change in the reference signal configuration for the first type UE is active for the first type UE.

The change in reference signal configuration for the second type UE is active for the second type UE.

The reference signal of the first type UE and the reference signal of the second type UE are independently configured in the separate configuration mode, and the reference signal configuration of the first type UE and the reference signal configuration of the second type UE are separately configured. Therefore, a change corresponding to the reference signal configuration can be issued separately.

In some embodiments, the availability indication of the reference signal for the first type UE is active for the first type UE. The availability indication of the reference signal for the second type UE is active for the second type UE. The reference signal configurations of the two types of UE are independently configured, so the availability indication is set separately and is active for the corresponding type of UE.

Figure 3:
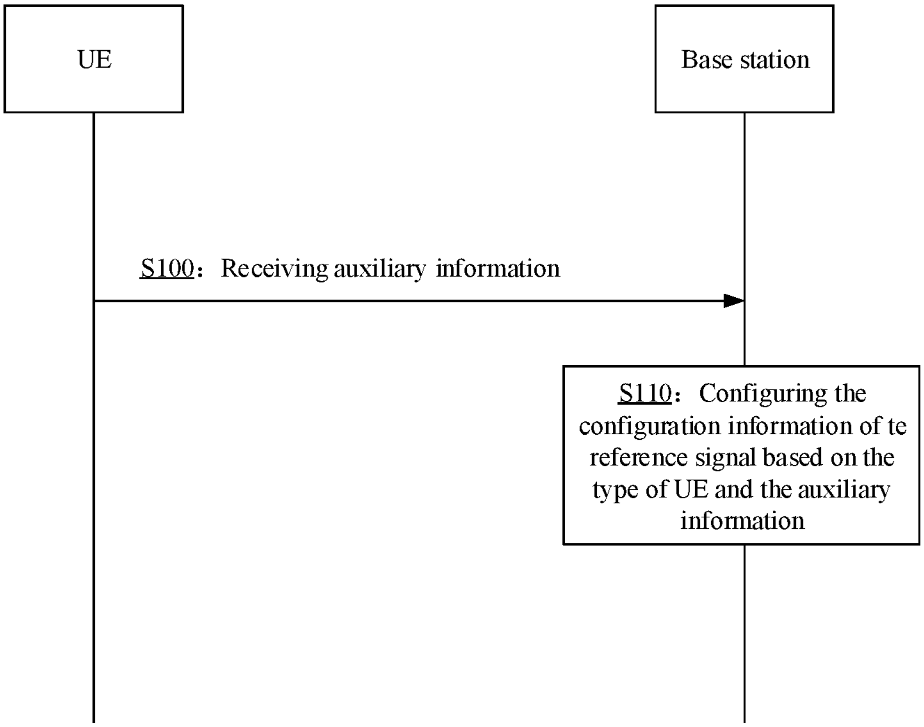
FIG. 3 is a flowchart illustrating an information processing method according to an example.

In one embodiment, as shown in FIG. 3, the method further includes S100: receiving auxiliary information.

The S110 may include configuring the configuration information of the reference signal based on the type of UE and the auxiliary information.

In some embodiments, the UE will report auxiliary information to the base station for determining the configuration information of the reference signal. If the base station receives the auxiliary information reported by the UE, it will combine the type of UE and auxiliary information to configure the configuration information of the reference signal for that type of UE.

In some embodiments, the auxiliary information may include: a reference signal configuration recommended by the UE, or information reported by the UE related to the type of UE and/or UE capability, which can be used by the base station to configure the reference signal configuration for this type of UE according to characteristics of this type of UE.

In some cases, the base station may not receive the auxiliary information reported by the UE, or it may not want to receive the auxiliary information on the UE. For example, if the base station knows that the reference signal can be used or must be used for non-connected UE according to the protocol, it is not necessary to determine whether the UE supports the use of the reference signal in non-connected state by the auxiliary information.

For example, if the protocol specifies that the reference signal is used for UE in idle state or non-connected state, the network side may not receive auxiliary information from the UE.

Alternatively, if the protocol specifies that the reference signal being used for UE in the idle state or inactive state is a mandatory option, the base station at least may not need to receive auxiliary information indicating whether the UE supports the use of the reference signal in the idle state or inactive state from the UE side.

In one embodiment, the auxiliary information indicates at least one of the following: whether the UE supports the use of reference signal in the idle state and/or inactive state, for example, whether the UE supports the time-frequency domain synchronization with the base station according to the reference signal in the idle state and/or inactive state; and the time domain offset between the reference signal and PO supported by UE.

In one embodiment, if the protocol specifies that the reference signal being used for UE in the idle state or inactive state is optional; alternatively, if the protocol does not explicitly specify that the reference signal can be used for UE in idle state or inactive state, then the base station may need to determine that the reference signal can be used for UE in idle state or inactive state through the received auxiliary information.

In some embodiments, the receiving auxiliary information includes: receiving auxiliary information in response to the protocol not specifying the use of the reference signal for UE in idle state or inactive state; or receiving auxiliary information in response to the protocol not specifying the use of the reference signal for UE in idle state or inactive state is a mandatory function.

In some embodiments, the auxiliary information is carried and reported in the UE capability message.

The UE capability message can be any message that UE reports UE capability, for example, a dedicated message that reports UE capability.

In one embodiment, the UE capability message includes but is not limited to: UE-Radio PagingInfo. Of course, this is only an example of UE capability message, and the specific implementation is not limited to this.

In the embodiment of the disclosure, changes in the reference signal configurations for the first and/or second type UE can be carried in the change message issued by the base station. This change message can be various physical layer messages and/or high-level messages. For example, a change message carrying changes to the reference signal configurations for the first type UE and/or the second type UE may be an RRC message.

Figure 4:
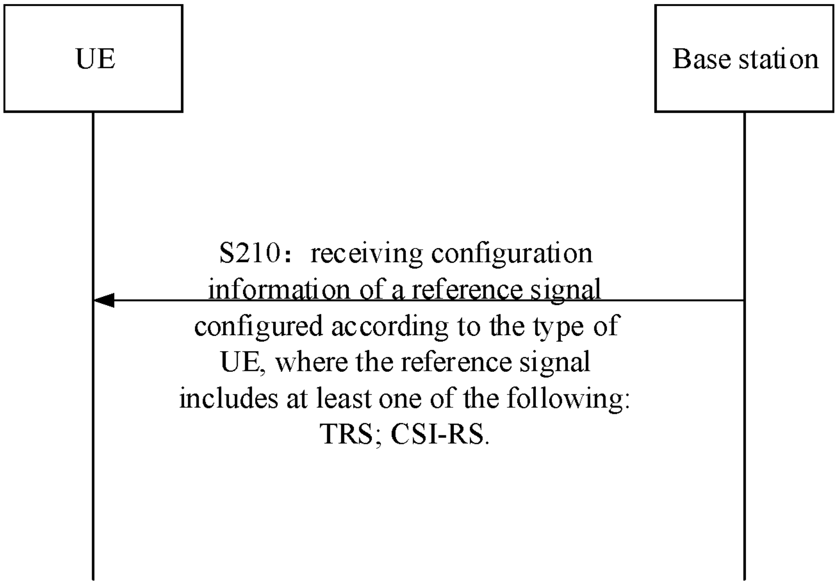
FIG. 4 is a flowchart illustrating an information processing method according to an example.

As shown in FIG. 4, according to the embodiment of the disclosure, it provides an information processing method, where the method is applied to UE, and the method includes S210: receiving configuration information of a reference signal configured according to the type of UE, where the reference signal includes at least one of the following: TRS; CSI-RS.

In the embodiment of the disclosure, the UE can be a first type UE and/or a second type UE.

UE receives configuration information, then receives/monitors reference signal based on the configuration information, and then performs the first and/or second functions based on the received reference signal.

In the embodiment of the disclosure, the UE executing the information processing method can be UE in any state.

After receiving the configuration information, the UE can use the reference signal configured by the configuration information for the non-connected state of the UE. The UE in non-connected state can be: UE in idle state and UE in inactive state.

The configuration information of the reference signal is determined based on the type of UE. Therefore, the UE receives or monitors the reference signal based on the configuration information, which can meet the needs of the UE to perform the first and second functions mentioned above while also having low power consumption.

In one embodiment, the reference signal can be used for time-frequency domain synchronization between UE in idle state or inactive state and the base station; and/or, the reference signal can be used for wireless resource management RRM measurement of UE in idle state or inactive state; and/or, the reference signal can be used for AGC of UE in idle state or inactive state.

In one embodiment, the type of UE at least includes: a first type UE; a second type UE. The bandwidth supported by the first type UE is greater than the bandwidth of the second type UE.

The UE that currently receives the configuration information can be the first type UE or the second type UE. The type of UE can include a first type UE and a second type UE.

The first type UE here can be eMBB UE. The second type UE can be Redcap UE.

In one embodiment, the configuration information of the reference signal is also used for phase tracking and/or channel state information acquisition of UE in the connected state. The UE in the connected state includes: the first type UE in the connected state and/or the second type UE in the connected state. Alternatively, the configuration information of the reference signal for the second type UE is not used for phase tracking and/or channel state information acquisition of UE in the connected state.

In one embodiment, the first type UE is an enhanced mobile broadband eMBB UE; and/or, the second type UE is a Reduced Capability Redcap UE.

In one embodiment, the configuration information of the reference signal is used for the first type UE in the connected state and the second type UE in the connected state. Alternatively, the configuration information of the reference signal is used for the first type UE in the connected state. Alternatively, the configuration information of the reference signal is used for the second type UE in the connected state.

In the embodiment of the disclosure, the configuration information has multiple configuration modes, and three optional modes are provided as follows:

Mode 1: common configuration, also known as the same configuration, refers to configuring the same set of reference signal configurations for the first type UE and second type UE, which are shared by the first type UE and the second type UE.

Mode 2: correlation configuration refers to configuring two sets of reference signal configurations for the reference signal configurations of the first type UE and the second type UE, but these two sets of reference signal configurations are correlated.

Mode 3: separate configuration or individual configuration refers to configuring two sets of reference signal configurations separately for the first type UE and the second type UE. These two sets of reference signal configurations can be correlated or not correlated.

For example, for the correlation configuration, in one embodiment, the configuration information of the reference signal includes: a set of reference signal configurations shared by the first type UE and the second type UE.

In one embodiment, in response to the first type UE and the second type UE sharing the same BWP, the first type UE and the second type UE share a set of reference signal configurations.

In one embodiment, in response to the first type UE and the second type UE sharing a set of reference signal configurations, the configuration information is determined based on the second type UE. Alternatively, in response to the first type UE and the second type UE sharing a set of reference signal configurations, the configuration information is determined based on the first type UE, where the configuration information of the reference signal is used by the second type UE to select a part of the bandwidth supported by the second type UE to monitor the reference signal within the bandwidth range of the reference signal.

If the first type UE and the second type UE share a set of reference signal configurations, and if the set of reference signal configurations is based on the second type UE, then the reference signal can be successfully detected by the second type UE with weaker UE capability, it is obvious that it can also be successfully detected by the first type UE. For example, the configuration information is configured based on the bandwidth supported by the second type UE, or the configuration information is determined based on the frequency domain offset of the reference signal from the center frequency point of the SSB supported by the second type UE, or for the purpose of power saving, based the time offset of the reference signal from the PO supported by the UE.

At this point, no matter whether it is the first type UE or the second type UE, once it receives the configuration information, it can monitor the reference signal based on the set of reference signal configurations contained in the configuration information.

If the set of reference signal configurations contained in the configuration information is configured based on the first type UE, for example, the set of reference signal configurations is determined based on the bandwidth supported by the first type UE.

At this point, if the UE currently receiving configuration information is the second type UE, then when the second type UE monitors the reference signal based on the configuration information, it first selects a part of the bandwidth supported by the second type UE within the frequency range of the reference signal transmission, and then monitor the reference signal on the selected bandwidth.

In summary, in the embodiment of the disclosure, both the first type UE and the second type UE share a reference signal configuration, but this reference signal configuration takes into account the type of UE.

In some embodiments, in response to the first type UE and the second type UE sharing a set of reference signal configurations, changes in the configuration information of the reference signal are active for the first type UE and the second type UE.

Since the first type UE and the second type UE share a set of reference signal configurations, changes to the set of reference signal configurations will be active for both the first type UE and the second type UE.

In one embodiment, the availability indication of the reference signal acts on the first type UE and the second type UE.

If the configuration information carries a set of reference signal configurations shared by the first type UE and the second type UE, the availability indication of the reference signal will be applied to both the first type UE and the second type UE simultaneously.

For example, in one embodiment, for the correlation configuration, the configuration information of the reference signal includes: a reference signal configuration for the first type UE and a reference signal configuration for the second type UE; where the reference signal configuration for the first type UE is at least partially different from the reference signal configuration for the second type UE.

Due to correlation configuration, the configuration information received by the UE from the base station will carry two sets of correlated reference signal configurations for the first type of UE and for the second type of UE.

In one embodiment, in response to the configuration information of the reference signal including a reference signal configuration for the first type UE and a reference signal configuration for the second type UE, the configuration information is correlatively configured based on the types of the first type UE and the second type UE.

In one embodiment, in response to the configuration information of the reference signal including a reference signal configuration for the first type UE and a reference signal configuration for the second type UE, the frequency range of the reference signal for the second type UE is within the frequency range of the reference signal for the first type UE; and/or, in response to the configuration information of the reference signal including a reference signal configuration for the first type UE and a reference signal configuration for the second type UE, the second cycle of the reference signal for the second type UE is N times of the first cycle of the reference signal for the first type UE, where N is a positive integer.

In one embodiment, a change in the reference signal configuration for the first type UE is active for the first type UE and the second type UE; alternatively, a change in reference signal configuration for the second type UE is active for the second type UE.

For correlation configuration, the reference signal configuration for the second type UE is dependent on the reference signal configuration for the first type UE. Therefore, changes in the reference signal configuration for the first type UE will affect the reference signal configuration for the second type UE. Therefore, changes in the reference signal configuration for the first type UE will also affect both the first type UE and the second type UE. If the UE that currently receives configuration information and changes the reference signal configuration for the first type UE is the first type UE, execute the change. If the UE that currently receives configuration information and changes the reference signal configuration for the first type UE is the second type UE, the reference signal configuration for the second type UE can be adaptively changed based on change as well as the correlation between the reference signal configuration for the first type UE and the reference signal configuration for the second type UE. For example, the correlation between the reference signal configuration for the first type UE and the reference signal configuration for the second type UE can be reflected in the relationship between the frequency range and/or cycle of the reference signal transmission configured by the reference signal configuration for the first type UE and the reference signal configuration for the second type UE.

If the reference signal configuration is separately for the second type UE, it can be active for the second type UE separately, but not for the first type UE. At this point, if the first type UE does not receive the change, the reference signal configuration for the first type UE can maintain the current active configuration.

In some embodiments, the availability indication of the reference signal for the first type UE is active for the first type UE and the second type UE. Alternatively, the availability indication of the reference signal for the second type UE is active for the second type UE.

Similarly, due to the correlation configuration, the reference signal configuration for the second type UE depends on the reference signal configuration for the first type UE. The availability indication of the reference signal for the first type UE will be active simultaneously for both the first type UE and the second type UE. However, the availability indication of the reference signal for the second type of UE alone may only be active for the second type of UE alone.

For example, for individual configuration mode or separate configuration modes, in some embodiments, the configuration information is configured respectively based on the types of the first type UE and the second type UE in response to the configuration information of the reference signal including the reference signal configuration for the first type UE and the reference signal configuration for the second type UE.

Due to that the preset reference configurations for the first type UE and the second type UE are separately configured, the characteristics of the first type UE and/or the second type UE can be flexibly considered when configuring the reference signal for the first type UE and the reference signal for the second type UE respectively.

For example, in some embodiments, a change in the reference signal configuration for the first type UE is active for the first type UE.

A change in reference signal configuration for the second type UE is active for the second type UE.

For example, the availability indication of the reference signal for the first type UE is active for the first type UE.

The availability indication of the reference signal for the second type UE is active for the second type UE.

Figure 5:
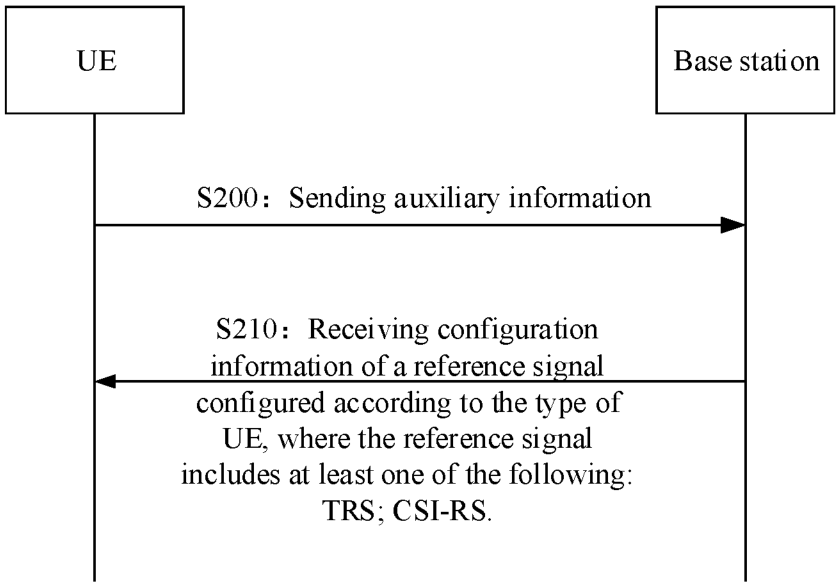
FIG. 5 is a flowchart illustrating an information processing method according to an example.

For example, as shown in FIG. 5, the method further includes S200: sending auxiliary information; where the auxiliary information is used by the base station to configure the configuration information of the reference signal.

This auxiliary information can carry any information necessary for the reference signal configuration by the base station.

In some embodiments, the auxiliary information indicates at least one of the following: whether the UE support the use of reference signals in UE in idle state and/or inactive state; the time domain offset supported by UE between the reference signal and PO.

In some embodiments, the S200 may include: sending auxiliary information in response to the protocol not specifying the use of the reference signal for UE in idle state and/or inactive state; or sending auxiliary information in response to the protocol not specifying that the use of the reference signal for UE in idle state or inactive state is a mandatory function. For example, sending auxiliary information in response to the protocol not specifying the use of the reference signal for UE in idle state and/or inactive state, including: sending auxiliary information indicating that the reference signal is used for UE in idle state and/or inactive state in response to the protocol not specifying the use of the reference signal for UE in idle state and/or inactive state.

For example, sending auxiliary information in response to the protocol not specifying the use of the reference signal for UE in idle state or inactive state is a mandatory function may include: sending auxiliary information indicating that the reference signal is used for UE in idle state and/or inactive state in response to the protocol not specifying the use of the reference signal for UE in idle state or inactive state is a mandatory function.

In one embodiment, the auxiliary information is carried in the UE capability message.

For example, the UE capability information includes but is not limited to: UE wireless paging message.

In one embodiment, the method further includes: hopping and receiving the reference signal based on the configuration information.

If the current working BWP of the UE is far away from the frequency domain position of the reference signal, the UE needs to receive the reference signal through frequency hopping.

The current working BWP of the UE includes but is not limited to downlink initial BWP and/or activation BWP.

In some embodiments, the reference signal is received by frequency hopping according to the configuration information, including: receiving the reference signal through frequency hopping based on the configuration information in response to the distance between the frequency domain position of the reference signal and the frequency domain position of the center frequency point of the SSB being greater than a preset value.

For Redcap UE, more SSBs may be required for synchronization, so the use of TRS/CSI-RS is more critical for Redcap UE. For Redcap UE, there is bandwidth limitations.

For Redcap UE, the minimum terminal bandwidth supported on frequency band 1 (FR)1/FR2 is 20 M and 100 M, respectively, while eMBB UE can support bandwidth greater than 100 M. Therefore, the TRS/CSI-RS configured for eMBB UE may not necessarily be suitable for Redcap UE. At this point, when there are both eMBB UE and Redcap UE in a network, how to consider the TRS/CSI-RS used by Redcap UE is a key issue that needs to be considered in scenarios where two types of UE coexist. A way to configure TRS/CSI-RS for Redcap UE is provided herein.

The network configures additional TRS/CSI-RS configuration information for specific type of UE, and the reference signal corresponding to the configuration information is used for UE in idle state/inactive state.

As an embodiment, a specific type of UE may include eMBB UE (first type UE) and/or Redcap UE (second type UE), among others.

It can be understood that the network configures additional TRS/CSI-RS configuration information for the first type UE and the second type UE, and the UE set in connection state which is provided with additional TRS/CSI-RS may be the same or different.

The UE set in connected state corresponding to the configuration information of TRS/CSI-RS can have multiple types, as follows:

Case 1: Configure additional TRS/CSI-RS configuration information for the first type UE and the second type UE. The UE set in connected state providing the additional TRS/CSI-RS includes the UE in connected state of the first type and the UE in connected state of the second type, respectively.

Case 2: Configure additional TRS/CSI-RS configuration information for the first type UE and the second type UE. The UE set in connected state providing the additional TRS/CSI-RS only includes the UE in connected state of the second type.

Scenario 3: Configure additional TRS/CSI-RS configuration information for the first type UE and the second type UE. The UE set in connected state providing the additional TRS/CSI-RS only includes the UE in connected state of the first type.

As one embodiment, the configuration information of TRS/CSI-RS is configured for the second type UE, and providing TRS/CSI-RS does not need to depend on the TRS/CSI-RS sharing provided by the UE in the connected state, which can be configured separately (for ease of understanding, the synchronization of the second type of terminal is relatively slow, so the network can provide an additional set of separate TRS/CSI-RS, which does not need to depend on the TRS/CSI-RS sharing provided by the UE in the connected state)

It is to be noted that the UE set in the connected state that provides additional TRS/CSI-RS within the cell ranges from available to unavailable. For example, if UE switches or releases, and it will result in a change in the availability indication of TRS/CSI-RS, that is, from available to unavailable.

Method 1: The network configures the same set of reference signal configurations of additional TRS/CSI-RS for the first type UE and the second type UE, or configures a separate set of reference signal configurations of additional TRS/CSI-RS.

It can be understood that the network configuring one same set of reference signal configurations of the additional TRS/CSI-RS has the following two manners:

Manner 1: It is necessary to limit the parameter of the configured TRS/CSI-RS, such as limit the parameter within the bandwidth range supported by the second type UE. For example, the bandwidth supported by Redcap UE on FR1 and FR2 is 20 M; the bandwidth supported by Embb UE on FR1 and FR2 is 100 M.

Manner 2: There is no need to limit the bandwidth parameters of the configured TRS/CSI-RS within the bandwidth range supported by the second type UE. At this point, for the second type UE, TRS/CSI-RS within its bandwidth support range will be directly used for auxiliary synchronization operations.

At this point, the UE set in the connected state that provides additional TRS/CSI-RS can be the UE set provided by case 2 or case 3.

At this point, the configuration change and/or availability change of TRS/CSI-RS will be active for both the first type UE and the second type UE. That is, the configuration change and/or availability change of TRS/CSI-RS notified by the network will result in two types of UEs obtaining new configuration and/or availability indication.

Method 2: The configuration information of TRS/CSI-RS is configured for the second type UE, where some configuration information multiplexes the configuration information of TRS/CSI-RS configured for the first type UE, while some configuration information can be different from that for the first type UE. That is, some configuration information is the same, and using this method can save signaling overhead.

As one embodiment, the frequency range configured for the first type UE is 100 M bandwidth, while the frequency range configured for the second type UE is 20 M bandwidth, which is taken from the 100 M bandwidth.

As one embodiment, the cycle configured for the first type UE is cycle1, while cycle2 configured for the second type UE is N times of cycle1. Among N cycles, 1 resource is used by the second type UE.

At this point, the UE in the connected state providing the additional TRS/CSI-RS is as provided in case 1 above.

At this point, the configuration information and/or availability change of TRS/CSI-RS will be active for both the first type UE and the second type UE.

At this point, the configuration information and/or availability changes of TRS/CSI-RS as a subset will only be active for the second type UE.

For example, since the resource used by TRS/CSI-RS of the Redcap UE is a subset of the resources used by TRS/CSI-RS of eMBB UE, if the configuration or availability state of TRS/CSI-RS of eMBB UE changes, it will inevitably affect redcapUE. It is also possible to keep the configuration or the availability state of eMBB UE unchanged, and only change the configuration and availability state of some resources used by redcapUE.

It can be understood that TRS/CSI-RS resource availabilities are set for the second type UE and the first type UE, respectively. The identification of this availability indication can include: flag1 and flag2. If flag1 is not available, both types of UE consider the resource to be unavailable; flag2 only applies to RedcapUE.

Method 3: The network configures configuration information of different additional TRS/CSI-RS for the first type UE and the second type UE.

As one embodiment, the frequency range configured for the second type UE is 20 M bandwidth, while the frequency range configured for the first type UE is 100 M bandwidth.

As one embodiment: the cycle configured for the second type UE is cycle2, and the cycle configured for the first type UE is cycle1.

Furthermore, cycle2 is greater than cycle1. That is, the cycle of TRS/CSI-RS of RedcapUE is more sparse.

As one embodiment: offset configured for the second type UE is offset2, and offset configured for the first type UE is offset1.

Furthermore, offset2 is greater than offset1.

The TRS/CSI-RS end of the first type UE and the second type UE can be configured with the same or different initial BWPs. Further, if it is a separated initial BWP, a separate TRS/CSI-RS configuration is required.

At this point, the UE set in the connected state that provides additional TRS/CSI-RS can be the UE set in Case 1.

At this point, the configuration information and/or availability changes of TRS/CSI-RS will be active for the first type UE and the second type UE respectively.

That is, the network notification of configuration changes and/or availability changes to TRS/CSI-RS for a certain set of configurations will only result in the specific type of UE acquiring new configuration and/or availability indication.

As one embodiment, specific type of UE may require reception by frequency hopping when using additional TRS/CSI-RS.

For example, the frequency domain position of the configured TRS/CSI-RS is far away from the center frequency point of the SSB.

As one embodiment, a specific type of UE can provide the network with the following auxiliary information: whether the UE supports the use of additional TRS/CSI-RS in idle/inactive state.

As one embodiment, whether to support this feature can be pre agreed in the protocol.

As one embodiment, it is a mandatory function for Redcap UE to support this feature. At this point, the network defaults to support this feature for this type of terminal.

The minimum offset value between TRS/CSI-RS and PO supported by UE is related to the terminal type.

As an embodiment, Redcap UE supports a minimum offset value that is no less than the minimum offset value supported by eMBB type terminal;

It is to be noted that terminal reporting the auxiliary information can be implemented by reporting the auxiliary information in the UE capability in the existing UE RadioPagingInfo to the base station.

For Method 1 and/or Method 2: in the case of configuring one set of resources, the network can configure the offset according to the larger reported offset value.

For method 3, offsets can be configured based on the reported offsets of eMBBUE and RedcapUE respectively.

Specific type of UE includes eMBB UE and Redcap UE. Availability indication of UE in connected state may act on specific types of UE, e.g., Redcap UE.

Figure 6:
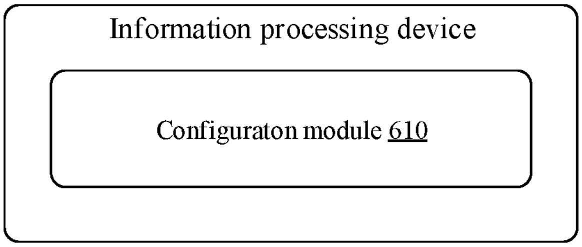
FIG. 6 is a schematic diagram of the structure of an information processing device according to an example.

As shown in FIG. 6, according to the embodiment of the disclosure, it provides an information processing device, which is applied in a base station and includes: configuration module 610 for configuring configuration information of a reference signal based on the user equipment UE type, where the reference signal includes at least one of the following: tracking reference signal TRS; channel state information-reference signal CSI-RS.

In one embodiment, the configuration module 610 may be a program module. After the program module is executed by the processor, configuring configuration information of a reference signal based on the type of UE can be executed.

In another embodiment, the configuration module 610 can be a combination of soft module and hard module. The combination of the software module and the hardware module includes but is not limited to various programmable gate arrays. The programmable gate array includes but is not limited to: Field Programmable Gate Array and/or Complex Programmable Logic Array.

In another embodiment, the configuration module 610 can also be a pure hardware module. The pure hardware module includes but is not limited to: dedicated integrated circuits.

In some embodiments, the reference signal can be used for time-frequency domain synchronization between UE in idle or inactive state and the base station; and/or, the reference signal can be used for wireless resource management RRM measurement of UE in idle or inactive state.

In some embodiments, the UE at least includes: a first type UE; a second type UE; where the bandwidth supported by the first type UE is greater than the bandwidth of the second type UE.

In some embodiments, the configuration information of the reference signal is also used for phase tracking and/or channel state information acquisition of UE in connected state. The UE in connected state includes: the first type UE in connected state and/or the second type UE in connected state. Alternatively, the configuration information of the reference signal for the second type UE is not used for phase tracking and/or channel state information acquisition of UE in connected state.

In some embodiments, the first type UE is an enhanced mobile broadband eMBB UE; and/or, the second type UE is reduced capacity Redcap UE.

In some embodiments, the configuration information of the reference signal is for the first type UE in connected state and the second type UE in connected state. Alternatively, the configuration information of the reference signal is for the first type UE in connected state. Alternatively, the configuration information of the reference signal is for the second type UE in connected state.

In some embodiments, the configuration information of the reference signal includes a set of reference signal configurations shared by the first type UE and the second type UE.

In some embodiments, in response to the first type UE and the second type UE sharing the same downlink initial BWP, the first type UE and the second type UE share a set of reference signal configurations.

In some embodiments, the configuration module 610 is configured to determine the configuration information of the reference signal based on the second type UE in response to the first type UE and the second type UE sharing a set of reference signal configurations; alternatively, determine the configuration information of the reference signal based on the first type UE in response to the first type UE and the second type UE sharing a set of reference signal configurations, where the configuration information of the reference signal is used by the second type UE to select a part of the bandwidth supported by the second type UE to monitor the reference signal within the bandwidth range of the reference signal.

In some embodiments, in response to the first type UE and the second type UE sharing a set of reference signal configurations, changes in the configuration information of the reference signal are active for the first type UE and the second type UE.

In some embodiments, the availability indication of the reference signal acts on the first type UE and the second type UE.

In some embodiments, the configuration information of the reference signal includes: a reference signal configuration for the first type UE and a reference signal configuration for the second type UE; where, the reference signal configuration for the first type UE is at least partially different from the reference signal configuration for the second type UE.

In some embodiments, the configuration module 610 is configured to correlatively configure a reference signal configuration for the first type UE and a reference signal configuration for the second type UE based on the first type UE and the second type UE in response to the configuration information of the reference signal including the reference signal configuration for the first type UE and the reference signal configuration for the second type UE.

In some embodiments, the configuration module 610 is configured such that in response to the configuration information of the reference signal including a reference signal configuration for the first type UE and a reference signal configuration for the second type UE, the frequency range of the reference signal for the second type UE is within the frequency range of the reference signal for the first type UE; and/or, in response to the configuration information corresponding to the reference signal including a reference signal configuration for the first type UE and a reference signal configuration for the second type UE, the second cycle of the reference signal for the second type UE is N times of the first cycle of the reference signal for the first type UE, where N is a positive integer.

In some embodiments, the configuration module 610 is configured to correlatively configure a reference signal configuration for the first type UE and a reference signal configuration for the second type UE in response to the first type UE and the second type UE using the same downlink initial BWP.

In some embodiments, changes in the reference signal configuration for the first type UE are active for the first type UE and the second type UE; and/or, changes in the reference signal configuration for the second type UE are active for the second type UE.

In some embodiments, the availability indication of the reference signal for the second type UE is active for the first type UE and the second type UE; and/or, the availability indication of the reference signal for the second type UE is active for the second type UE.

In some embodiments, the configuration module 610 is configured to configure a reference signal configuration for the first type UE and a reference signal configuration for the second type UE respectively in response to the configuration information of the reference signal including the reference signal configuration for the first type UE and the reference signal configuration for the second type UE.

In some embodiments, the configuration module 610 is specifically used to perform at least one of the following:

- configure the frequency range of the reference signal of the first type UE based on the bandwidth supported by the first type UE, and configure the frequency range of the reference signal of the second type UE based on the bandwidth supported by the second type UE;
- configure the cycle of the reference signal for the first type UE and the cycle of the reference signal for the second type UE respectively;
- configure the time domain offset of the reference signal for the first type UE from the paging occasion PO in the time domain according to the time domain offset supported by the first type UE; configure the time domain offset of the reference signal for the second type UE from the PO in the time domain according to the time domain offset supported by the second type UE.

In some embodiments, the frequency domain offset of the reference signal for the first type UE from the PO is smaller than the frequency domain offset of the reference signal for the second type UE from the PO in the frequency domain.

In some embodiments, the configuration module 610 is configured to configure a reference signal configuration for the first type UE and a reference signal configuration for the second type UE respectively in response to the initial downlink BWPs of the first type UE and the second type UE being different.

In some embodiments, changes in the reference signal configuration for the first type UE are active for the first type UE.

The changes in reference signal configuration for the second type UE are active for the second type UE.

In some embodiments, the availability indication of the reference signal for the first type UE is active for the first type UE.

The availability indication of the reference signal for the second type UE is active for the second type UE.

In some embodiments, the device further includes: auxiliary information module, configured to receive auxiliary information.

The configuration module 610 is configured to configure the configuration information of the reference signal based on the type of UE and the auxiliary information.

In some embodiments, the auxiliary information indicates at least one of the following: whether the UE support the use of reference signals in UE in idle state and/or inactive UE state; the time domain offset supported by UE between the reference signal and PO.

In some embodiments, the auxiliary information module is configured to receive auxiliary information in response to the protocol not specifying the use of the reference signal for UE in idle state and/or inactive state; or, receive auxiliary information in response to the protocol not specifying that the use of the reference signal for UE in the idle state or inactive state is a mandatory function.

The auxiliary information is carried and reported in the UE capability message.

Figure 7:
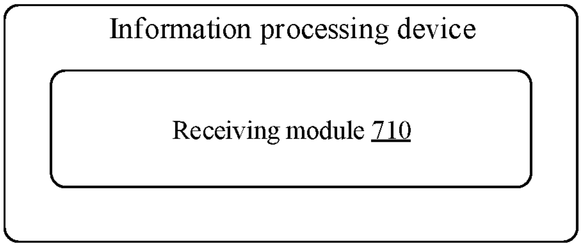
FIG. 7 is a schematic diagram of the structure of an information processing device according to an example.

As shown in FIG. 7, according to the embodiment of the disclosure, it provides an information processing device, where the device is applied in UE and includes: a receiving module 710 configured to receive configuration information of a reference signal configured according to the type of UE. The reference signal includes at least one of the following: tracking reference signal TRS; channel state information-reference signal CSI-RS.

In one embodiment, the receiving module 710 may be a program module. After the program module is executed by the processor, receiving configuration information of the reference signal configured according to the type of UE can be executed.

In another embodiment, the receiving module 710 may be a combination of soft module and hard module. The combination of the software module and the hardware module includes but is not limited to various programmable gate arrays. The programmable gate array includes but is not limited to: Field Programmable Gate Array and/or Complex Programmable Logic Array.

In another embodiment, the receiving module 710 may also be a pure hardware module. The pure hardware module includes but is not limited to: dedicated integrated circuits.

In one embodiment, the reference signal can be used for time-frequency domain synchronization between UE in idle or inactive state and the base station; and/or, the reference signal can be used for wireless resource management RRM measurement of UE in idle or inactive state.

In one embodiment, the UE at least includes: a first type UE; a second type UE; where the bandwidth supported by the first type UE is greater than the bandwidth of the second type UE.

In one embodiment, the configuration information of the reference signal is also used for phase tracking and/or channel state information acquisition of UE in connected state. The UE in connected state includes: the first type UE in connected state and/or the second type UE in connected state. Alternatively, the configuration information of the reference signal for the second type UE is not used for phase tracking and/or channel state information acquisition of UE in connected state. In one embodiment, the first type UE is an enhanced mobile broadband eMBB UE; and/or, the second type UE is a reduced capability Redcap UE.

In one embodiment, the configuration information of the reference signal is for the first type UE in connected state and the second type UE in connected state. Alternatively, the configuration information of the reference signal is for the first type UE in connected state. Alternatively, the configuration information of the reference signal is for the second type UE in connected state.

In one embodiment, the configuration information of the reference signal includes: a set of reference signal configurations shared by the first type UE and the second type UE.

In one embodiment, in response to the first type UE and the second type UE share the same BWP, the first type UE and the second type UE share a set of reference signal configurations.

In one embodiment, in response to the first type UE and the second type UE sharing a set of reference signal configurations, the configuration information is determined based on the second type UE.

Alternatively, in response to the first type UE and the second type UE sharing a set of reference signal configurations, the configuration information is determined based on the first type UE, where the configuration information of the reference signal is used by the second type UE to select a part of the bandwidth supported by the second type UE to monitor the reference signal within the bandwidth range of the reference signal.

In one embodiment, in response to the first type UE and the second type UE sharing a set of reference signal configurations, changes in the configuration information of the reference signal are active for the first type UE and the second type UE.

In one embodiment, the availability indication of the reference signal acts on the first type UE and the second type UE.

In one embodiment, the configuration information of the reference signal includes: a reference signal configuration for the first type UE and a reference signal configuration for the second type UE; where the reference signal configuration for the first type UE is at least partially different from the reference signal configuration for the second type UE.

In one embodiment, in response to the configuration information of the reference signal including a reference signal configuration for the first type UE and a reference signal configuration for the second type UE, the configuration information is configured correlatively based on the first type UE and the second type UE.

In one embodiment, in response to the configuration information of the reference signal including a reference signal configuration for the first type UE and a reference signal configuration for the first type UE, the frequency range of the reference signal for the second type UE is within the frequency range of the reference signal for the first type UE; and/or, in response to the configuration information of the reference signal including a reference signal configuration for the first type UE and a reference signal configuration for the first type UE, the second cycle of the reference signal for the second type UE is N times of the first cycle of the reference signal for the first type UE, where N is a positive integer.

In one embodiment, a change in the reference signal configuration for the first type UE is active for the first type UE and the second type UE; and/or, a change in reference signal configuration for the second type UE is active for the second type UE.

In one embodiment, the availability indication of the reference signal for the first type UE is active for the first type UE and the second type UE; and/or, the availability indication of the reference signal for the second type UE is active for the second type UE.

In one embodiment, in response to the configuration information of the reference signal including a reference signal configuration for the first type UE and a reference signal configuration for the second type UE, the configuration information is configured according to the types of the first type UE and the second type UE, respectively.

In one embodiment, a change in the reference signal configuration for the first type UE is active for the first type UE.

A change in reference signal configuration for the second type UE is active for the second type UE.

In one embodiment, the availability indication of the reference signal for the first type UE is active for the first type UE.

The availability indication of the reference signal for the second type UE is active for the second type UE.

In one embodiment, the method further includes: sending auxiliary information; where the auxiliary information is used by the base station to configure the configuration information of the reference signal.

In one embodiment, the auxiliary information indicates at least one of the following: whether the UE support the use of reference signals in UE in idle and/or inactive states; the time domain offset supported by UE between the reference signal and PO.

In one embodiment, the receiving module 710 is configured to send auxiliary information in response to the protocol not specify the use of the reference signal for UE in idle state and/or inactive state; or, send auxiliary information in response to the protocol not specifying that the use of the reference signal for UE in idle state and/or inactive state is a mandatory function.

In one embodiment, the auxiliary information is carried in the UE capability message.

In one embodiment, the receiving module 710 is configured to receive the reference signal by frequency hopping based on the configuration information.

In one embodiment, the receiving module 710 is configured to receive the reference signal by frequency hopping based on the configuration information, in response to the distance between the frequency domain position of the reference signal and the frequency domain position of the center frequency point of the SSB being greater than a preset value.

According to the embodiment of the disclosure, it provides a communication device, including: a memory used to store processor executable instructions; a processor connected to the memory; where the processor is configured to execute the control method and/or information processing method of the terminal provided by any of the aforementioned technical solutions.

The processor can include various types of storage media, which are non-transitory computer storage media that can continue to remember and store information on communication device after power failure.

Here, the communication device include: access device or UE or core network device.

The processor can be connected to the memory through a bus or other means for reading executable programs stored on the memory, for example, at least one of the methods shown in FIG. 2 to FIG. 5.

Figure 8:
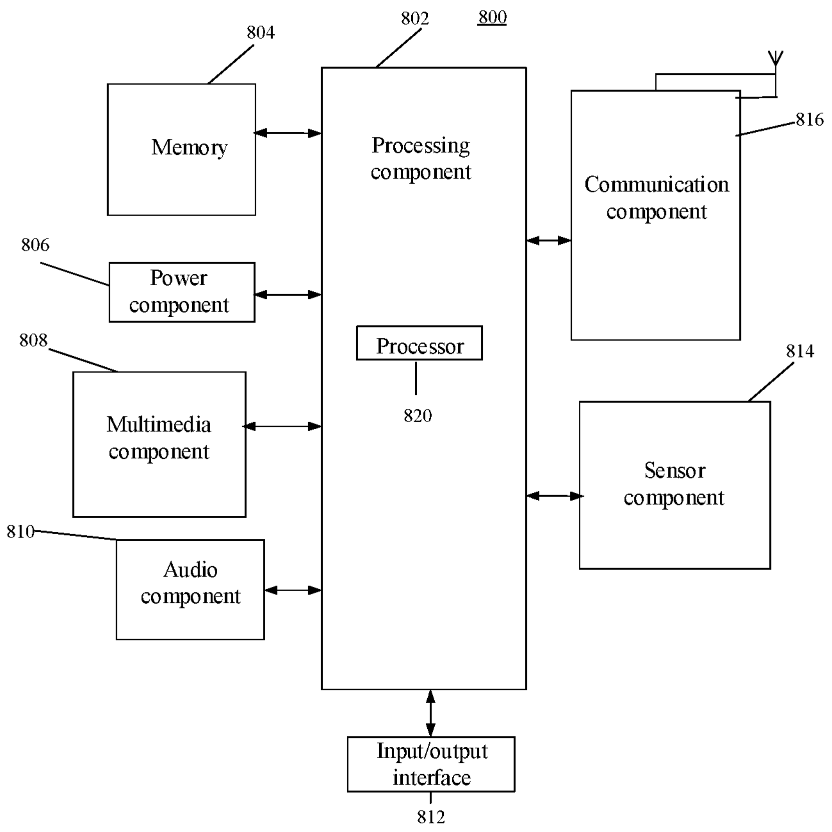
FIG. 8 is a schematic diagram of the structure of a UE according to an example.

FIG. 8 is a block diagram of a UE800 shown according to an example. For example, UE 800 can be mobile phone, computer, digital broadcasting user device, messaging device, game console, tablet device, medical device, fitness device, personal digital assistant, etc.

Referring to FIG. 8, UE800 can include one or more of the following components: processing component 802, memory 804, power component 806, multimedia component 808, audio component 810, input/output (I/O) interface 812, sensor component 814, and communication component 816.

The processing component 802 typically controls the overall operation of the UE800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate the interaction between the processing component 802 and other components. For example, processing component 802 may include a multimedia module to facilitate interaction between multimedia component 808 and processing component 802.

Memory 804 is configured to store various types of data to support operations on UE800. Examples of these data include instructions for any application or method used to operate on UE800, contact data, phone book data, messages, images, videos, etc. Memory 804 can be implemented by any type of volatile or non-volatile storage device or a combination of them, such as static random access memory (SRAM), electrically erasable programmable read-only memory (EEPROM), erasable programmable read-only memory (EPROM), programmable read only memory (PROM), read-only memory (ROM), magnetic memory, flash memory, magnetic disk or optical disc.

The power component 806 provides power to various components of the UE800. The power component 806 can include a power management system, one or more power supplies, and other components associated with generating, managing, and distributing power for the UE800.

The multimedia component 808 includes a screen providing an output interface between the UE800 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, multimedia component 808 includes a front camera and/or a rear camera. When the UE800 is in operating mode, such as shooting mode or video mode, the front camera and/or the rear camera can receive external multimedia data. Each of the front camera and the rear camera can be a fixed optical lens system or have focal length and optical zoom capability.

The audio component 810 is configured to output and/or input audio signals. For example, audio component 810 includes a microphone (MIC) configured to receive external audio signals when the UE800 is in operating modes such as call mode, recording mode, and speech recognition mode. The received audio signal can be further stored in memory 804 or transmitted through communication component 816. In some embodiments, audio component 810 also includes a speaker for outputting audio signals.

I/O interface 812 provides an interface between processing component 802 and peripheral interface module, and the peripheral interface module can be keyboard, click wheel, button, etc. These buttons can include but are not limited to: home button, volume button, start button, and lock button.

The sensor component 814 includes one or more sensors for providing state evaluation of various aspects for the UE800. For example, sensor component 814 can detect the open/closed state of device 800, the relative positioning of components, such as the display and keypad of UE800. Sensor component 814 can also detect changes in the position of UE800 or changes in the position of one component of UE800, the presence or absence of user contact with UE800, UE800 orientation or acceleration/deceleration, and temperature changes of UE800. Sensor component 814 can include a proximity sensor configured to detect the presence of nearby objects without any physical contact. The sensor component 814 can also include optical sensors, such as CMOS or CCD image sensors, for use in imaging applications. In some embodiments, the sensor component 814 may also include an acceleration sensor, gyroscope sensor, magnetic sensor, pressure sensor, or temperature sensor.

The communication component 816 is configured to facilitate wired or wireless communication between the UE800 and other devices. UE800 can access wireless network based on communication standard, such as WiFi, 2G, or 3G, or a combination of them. In an example, communication component 816 receives broadcast signals or broadcast related information from an external broadcast management system through a broadcast channel. In an example, the communication component 816 further includes a Near Field Communication (NFC) module to facilitate short range communication. For example, the NFC module can be implemented based on radio frequency identification (RFID) technology, infrared data association (IrDA) technology, ultra wideband (UWB) technology, Bluetooth (BT) technology, and other technologies.

In examples, UE800 can be implemented by one or more application specific integrated circuits (ASICs), digital signal processors (DSPDs), digital signal processing devices (DSPDs), programmable logic devices (PLDs), field programmable gate arrays (FPGAs), controllers, microcontrollers, microprocessors, or other electronic components to perform the aforementioned methods.

In examples, a non-transitory computer-readable storage medium including instructions is also provided, such as memory 804 including instructions, which can be executed by processor 820 of UE800 to achieve the above method. For example, the non-transitory computer readable storage medium can be ROM, random access memory (RAM), CD-ROM, magnetic tape, floppy disk, optical data storage device, etc.

Figure 9:
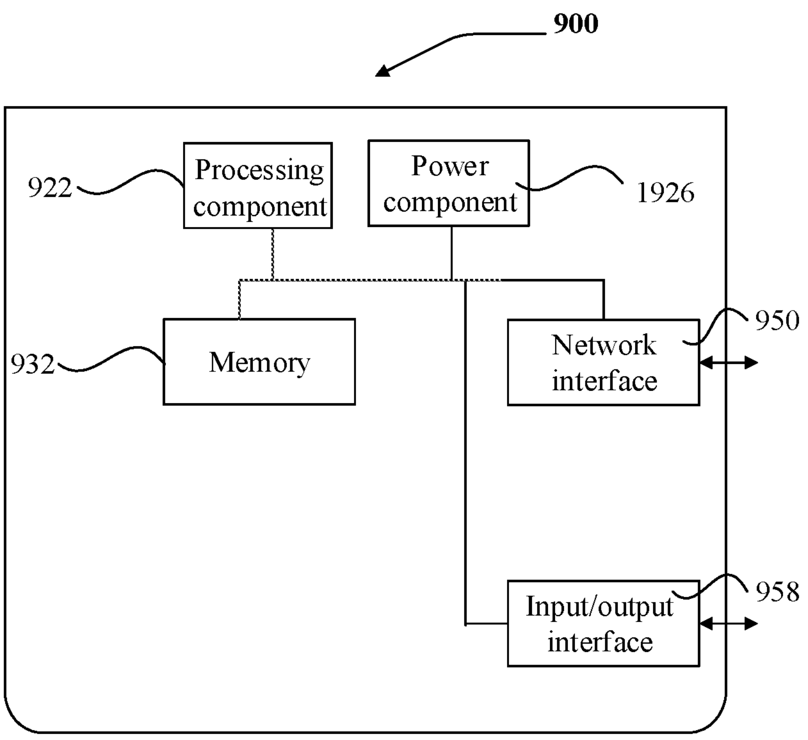
FIG. 9 is a schematic diagram of the structure of a communication device according to an example.

As shown in FIG. 9, according to an embodiment of the present disclosure, it illustrates the structure of an access device. For example, communication device 900 can be provided as a network side device. The communication device can be the aforementioned access device and/or core network device.

Referring to FIG. 9, communication device 900 includes processing component 922, which further includes one or more processors, as well as memory resources represented by memory 932, for storing instructions that can be executed by processing component 922, such as application programs. The application programs stored in memory 932 may include one or more modules each corresponding to a set of instructions. In addition, the processing component 922 is configured to execute instructions to execute any of the aforementioned methods applied to the access device, such as the methods shown in FIG. 2 to FIG. 5.

The communication device 900 may also include a power component 926 configured to perform power management of the communication device 900, a wired or wireless network interface 950 configured to connect the communication device 900 to the network, and an input/output (I/O) interface 958. Communication device 900 can operate based on an operating system stored on memory 932, such as Windows Server™, Mac OS X™, Unix™, Linux™, FreeBSD™, etc.

After considering the specifications and practices of the disclosure herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the technical field that are not disclosed in the present disclosure. The specification and embodiments are only considered exemplary, and the true scope and spirit of the present disclosure are indicated by the following claims.

It should be understood that the present disclosure is not limited to the precise structure described above and shown in the accompanying drawings, and various modifications and changes can be made without departing from its scope. The scope of the present disclosure is limited only by the accompanying claims.

What is claimed is:

1. An information processing method, comprising:

configuring, by a base station, configuration information of a reference signal based on a type of a user equipment (UE), wherein the reference signal comprises at least one of following signals:

tracking reference signal (TRS); or channel state information-reference signal (CSI-RS), wherein the UE comprises at least one of a first type UE or a second type UE, and a bandwidth supported by the first type UE is greater than a bandwidth supported by the second type UE, wherein the configuration information of the reference signal is further used for at least one of phase tracking or channel state information acquisition of the UE in a connected state, wherein the UE in the connected state comprises at least one of followings: the first type UE in the connected state or the second type UE in the connected state; or the configuration information of the reference signal for the second type UE is not used for at least one of phase tracking or channel state information acquisition of the UE in the connected state, wherein the configuration information of the reference signal comprises:

a set of common reference signal configurations for the first type UE and the second type UE, wherein, in response to the first type UE and the second type UE sharing a same downlink initial bandwidth part BWP, the first type UE and the second type UE share the set of reference signal configurations.

2. The information processing method according to claim 1, wherein the reference signal is used in at least one of following manners:

the reference signal is used for time-frequency domain synchronization between the UE in idle state or inactive state and the base station; or the reference signal is used for wireless resource management RRM measurement of the UE in idle state or inactive state.

3. The information processing method according to claim 1, wherein the configuration information of the reference signal is in one of following manners:

the configuration information of the reference signal is for the first type UE in the connected state and the second type UE in the connected state;

the configuration information of the reference signal is for the first type UE in the connected state; or the configuration information of the reference signal is for the second type UE in the connected state.

4. The information processing method according to claim 1, wherein configuring the configuration information of the reference signal based on the type of the UE comprises:

determining the configuration information of the reference signal based on the second type UE in response to the first type UE and the second type UE sharing the set of reference signal configurations; or determining the configuration information of the reference signal based on the first type UE in response to the first type UE and the second type UE sharing the set of reference signal configurations, wherein the configuration information of the reference signal is used by the second type UE to select a part of the bandwidth supported by the second type UE to monitor the reference signal within a bandwidth range of the reference signal.

5. The information processing method according to claim 1, wherein the configuration information of the reference signal further comprises:

a reference signal configuration for the first type UE and a reference signal configuration for the second type UE;

wherein the reference signal configuration for the first type UE is at least partially different from the reference signal configuration for the second type UE.

6. The information processing method according to claim 5, wherein configuring the configuration information of the reference signal based on the type of the UE comprises:

correlatively configuring the reference signal configuration for the first type UE and the reference signal configuration for the second type UE based on the first type UE and the second type UE.

7. The information processing method according to claim 6, wherein, a frequency range of the reference signal for the second type UE is within a frequency range of the reference signal for the first type UE; or a second cycle of the reference signal for the second type UE is N times of a first cycle of the reference signal for the first type UE, wherein Nis a positive integer.

8. The information processing method according to claim 6, wherein the first type UE and the second type UE use a same downlink initial BWP.

9. The information processing method according to claim 6, wherein a change in the reference signal configuration for the first type UE is active for the first type UE and the second type UE; or a change in the reference signal configuration for the second type UE is active for the second type UE, wherein an availability indication of the reference signal for the second type UE is active for the first type UE and the second type UE; or the availability indication of the reference signal for the second type UE is active for the second type UE.

10. The information processing method according to claim 5, wherein configuring the configuration information of the reference signal based on the type of the UE comprises:

configuring the reference signal configuration for the first type UE and the reference signal configuration for the second type UE respectively.

11. The information processing method according to claim 10, wherein configuring the reference signal configuration for the first type UE and the reference signal configuration for the second type UE respectively comprises at least one of followings:

configuring a frequency range of the reference signal for the first type UE based on the bandwidth supported by the first type UE, and configuring a frequency range of the reference signal for the second type UE based on the bandwidth supported by the second type UE;

configuring a cycle of the reference signal for the first type UE and a cycle of the reference signal for the second type UE respectively; or configuring a time domain offset of the reference signal for the first type UE from a paging occasion PO based on a time domain offset supported by the first type UE; configuring a time domain offset of the reference signal for the second type UE from the PO based on a time domain offset supported by the second type UE.

12. The information processing method according to claim 11, wherein, a frequency domain offset of the reference signal for the first type UE from the PO is smaller than a frequency domain offset of the reference signal for the second type UE from the PO in frequency domain.

13. The information processing method according to claim 10, wherein configuring the configuration information of the reference signal based on the type of the UE comprises:

configuring the reference signal configuration for the first type UE and the reference signal configuration for the second type UE respectively in response to downlink initial BWPs of the first type UE and the second type UE being different.

14. The information processing method according to claim 10, wherein, a change in the reference signal configuration for the first type UE is active for the first type UE;

a change in reference signal configuration for the second type UE is active for the second type UE, wherein an availability indication of the reference signal for the first type UE is active for the first type UE; and an availability indication of the reference signal for the second type UE is active for the second type UE.

15. The information processing method according to claim 1, further comprising:

receiving auxiliary information;

wherein configuring the configuration information of the reference signal based on the type of the UE comprises:

configuring the configuration information of the reference signal based on the type of the UE and the auxiliary information.

16. An information processing method, comprising:

receiving, by a user equipment (UE), configuration information of a reference signal configured based on a type of the UE, wherein the reference signal comprises at least one of following signals:

tracking reference signal (TRS); or channel state information-reference signal (CSI-RS), wherein the UE is a first type UE or a second type UE, and a bandwidth supported by the first type UE is greater than a bandwidth supported by the second type UE, wherein the configuration information of the reference signal is further used for at least one of phase tracking or channel state information acquisition of the UE in a connected state, wherein the UE in the connected state comprises at least one of followings: the first type UE in the connected state or the second type UE in the connected state; or the configuration information of the reference signal for the second type UE is not used for at least one of phase tracking or channel state information acquisition of the UE in the connected state, wherein the configuration information of the reference signal comprises:

a set of common reference signal configurations for the first type UE and the second type UE, wherein, in response to the first type UE and the second type UE sharing a same downlink initial bandwidth part BWP, the first type UE and the second type UE share the set of reference signal configurations.

17. The information processing method according to claim 16, further comprising:

sending auxiliary information; wherein the auxiliary information is used by a base station to configure the configuration information of the reference signal, wherein the auxiliary information indicates at least one of followings:

whether the UE support use of the reference signal in at least one of the UE in an idle state or an inactive UE state; or a time domain offset between the reference signal and PO supported by UE.

18. The information processing method according to claim 17, wherein sending the auxiliary information comprises:

sending the auxiliary information in response to a protocol not specifying use of the reference signal for at least one of the UE in the idle state or the inactive state; or sending the auxiliary information in response to a protocol not specifying that use of the reference signal for at least one of the UE in the idle state or the inactive state is a mandatory function.

19. The information processing method according to claim 16, further comprising:

receiving the reference signal by frequency hopping based on the configuration information in response to a distance between a frequency domain position of the reference signal and a frequency domain position of a center frequency point of SSB being greater than a preset value.

* * * * *